(12) United States Patent
Shokrollahi

(10) Patent No.: US 9,806,761 B1
(45) Date of Patent: Oct. 31, 2017

(54) METHODS AND SYSTEMS FOR REDUCTION OF NEAREST-NEIGHBOR CROSSTALK

(71) Applicant: Kandou Labs SA, Lausanne (CH)

(72) Inventor: Amin Shokrollahi, Preverenges (CH)

(73) Assignee: KANDOU LABS, S.A. (CH)

( * ) Notice: Subject to any disclaimer, the term of this patent is extended or adjusted under 35 U.S.C. 154(b) by 0 days.

(21) Appl. No.: 14/612,243

(22) Filed: Feb. 2, 2015

Related U.S. Application Data

(60) Provisional application No. 61/934,508, filed on Jan. 31, 2014.

(51) Int. Cl.
*H04J 1/12* (2006.01)
*H04B 3/32* (2006.01)

(52) U.S. Cl.
CPC ..................................... *H04B 3/32* (2013.01)

(58) Field of Classification Search
None
See application file for complete search history.

(56) References Cited

U.S. PATENT DOCUMENTS

| | | |
|---|---|---|
| 668,687 A | 2/1901 | Mayer |
| 780,883 A | 1/1905 | Hinchman |
| 3,196,351 A | 7/1965 | Slepian |
| 3,636,463 A | 1/1972 | Ongkiehong |
| 3,939,468 A | 2/1976 | Mastin |
| 4,163,258 A | 7/1979 | Ebihara et al. |
| 4,181,967 A | 1/1980 | Nash et al. |
| 4,206,316 A | 6/1980 | Burnsweig et al. |
| 4,276,543 A | 6/1981 | Miller |
| 4,486,739 A | 12/1984 | Franaszeck et al. |
| 4,499,550 A | 2/1985 | Ray et al. |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 5,053,974 A | 10/1991 | Penz |
| 5,166,956 A | 11/1992 | Baltus et al. |
| 5,168,509 A | 12/1992 | Nakamura et al. |
| 5,266,907 A | 11/1993 | Dacus |

(Continued)

FOREIGN PATENT DOCUMENTS

| | | |
|---|---|---|
| CN | 101478286 | 7/2009 |
| EP | 2039221 B1 | 2/2013 |

(Continued)

OTHER PUBLICATIONS

International Search Report and Written Opinion of the International Searching Authority, mailed Nov. 5, 2012, in International Patent Application S.N. PCT/EP2012/052767, 7 pages.

(Continued)

*Primary Examiner* — Otis L Thompson, Jr.
(74) *Attorney, Agent, or Firm* — Invention Mine LLC

(57) ABSTRACT

Methods and systems are described for reduction of crosstalk in multi-wire communications systems using ensemble codes. Constraints applied to code construction and/or permissible encoding sequences eliminate transmit patterns shown to generate capacitively coupled and/or inductively coupled crosstalk.

20 Claims, 11 Drawing Sheets

(56) References Cited

U.S. PATENT DOCUMENTS

| | | |
|---|---|---|
| 5,283,761 A | 2/1994 | Gillingham |
| 5,287,305 A | 2/1994 | Yoshida |
| 5,311,516 A | 5/1994 | Kuznicki |
| 5,331,320 A | 7/1994 | Cideciyan |
| 5,412,689 A | 5/1995 | Chan et al. |
| 5,449,895 A | 9/1995 | Hecht |
| 5,459,465 A | 10/1995 | Kagey |
| 5,461,379 A | 10/1995 | Weinman |
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss et al. |
| 5,626,651 A | 5/1997 | Dullien |
| 5,629,651 A | 5/1997 | Mizuno |
| 5,659,353 A | 8/1997 | Kostreski et al. |
| 5,727,006 A | 3/1998 | Dreyer |
| 5,802,356 A | 9/1998 | Gaskins |
| 5,825,808 A | 10/1998 | Hershey et al. |
| 5,856,935 A | 1/1999 | Moy |
| 5,875,202 A | 2/1999 | Venters |
| 5,945,935 A | 8/1999 | Kusumoto |
| 5,949,060 A | 9/1999 | Schattschneider |
| 5,982,954 A | 11/1999 | Delen |
| 5,995,016 A | 11/1999 | Perino |
| 6,005,895 A | 12/1999 | Perino et al. |
| 6,084,883 A | 7/2000 | Norrell et al. |
| 6,172,634 B1 | 1/2001 | Leonowich et al. |
| 6,175,230 B1 | 1/2001 | Hamblin et al. |
| 6,232,908 B1 | 5/2001 | Nakaigawa |
| 6,278,740 B1 | 8/2001 | Nordyke |
| 6,316,987 B1 | 11/2001 | Dally |
| 6,346,907 B1 | 2/2002 | Dacy |
| 6,359,931 B1 | 3/2002 | Perino et al. |
| 6,378,073 B1 | 4/2002 | Davis |
| 6,398,359 B1 | 6/2002 | Silverbrook |
| 6,404,820 B1 | 6/2002 | Postol |
| 6,417,737 B1 | 7/2002 | Moloudi et al. |
| 6,433,800 B1 | 8/2002 | Holtz |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino et al. |
| 6,509,773 B2 | 1/2003 | Buchwald |
| 6,556,628 B1 | 4/2003 | Poulton et al. |
| 6,563,382 B1 | 5/2003 | Yang et al. |
| 6,621,427 B2 | 9/2003 | Greenstreet |
| 6,624,699 B2 | 9/2003 | Yin |
| 6,650,638 B1 | 11/2003 | Walker et al. |
| 6,661,355 B2 | 12/2003 | Cornelius et al. |
| 6,664,355 B2 | 12/2003 | Kim |
| 6,766,342 B2 | 7/2004 | Kechriotis |
| 6,839,429 B1 | 1/2005 | Gaikwald et al. |
| 6,865,234 B1 | 3/2005 | Agazzi |
| 6,865,236 B1 | 3/2005 | Terry |
| 6,954,492 B1 | 10/2005 | Williams |
| 6,972,701 B2 | 12/2005 | Jansson |
| 6,990,138 B2 | 1/2006 | Bejjani |
| 6,991,038 B2 | 1/2006 | Guesnon |
| 6,999,516 B1 | 2/2006 | Rajan |
| 7,023,817 B2 | 4/2006 | Kuffner |
| 7,039,136 B2 | 5/2006 | Olson |
| 7,053,802 B2 | 5/2006 | Cornelius |
| 7,072,387 B1 * | 7/2006 | Betts .............. H04L 1/0041 375/219 |
| 7,080,288 B2 | 7/2006 | Ferraiolo |
| 7,082,557 B2 | 7/2006 | Schauer |
| 7,085,153 B2 | 8/2006 | Ferrant et al. |
| 7,127,003 B2 | 10/2006 | Rajan |
| 7,142,612 B2 | 11/2006 | Horowitz et al. |
| 7,142,865 B2 | 11/2006 | Tsai |
| 7,167,019 B2 | 1/2007 | Broyde et al. |
| 7,180,949 B2 | 2/2007 | Kleveland et al. |
| 7,184,483 B2 | 2/2007 | Rajan |
| 7,199,728 B2 | 4/2007 | Dally |
| 7,231,558 B2 | 6/2007 | Gentieu |
| 7,335,976 B2 | 2/2008 | Chen |
| 7,336,112 B1 | 2/2008 | Sha |
| 7,346,819 B2 | 3/2008 | Bansal |
| 7,356,213 B1 | 4/2008 | Cunningham et al. |
| 7,358,869 B1 | 4/2008 | Chiarulli et al. |
| 7,362,130 B2 | 4/2008 | Broyde et al. |
| 7,362,697 B2 | 4/2008 | Becker |
| 7,372,390 B2 | 5/2008 | Yamada |
| 7,389,333 B2 | 6/2008 | Moore et al. |
| 7,397,302 B2 | 7/2008 | Bardsley |
| 7,400,276 B1 | 7/2008 | Sotiriadis |
| 7,428,273 B2 | 9/2008 | Foster |
| 7,539,532 B2 | 5/2009 | Tran |
| 7,620,116 B2 | 11/2009 | Bessios |
| 7,633,850 B2 | 12/2009 | Ahn |
| 7,643,588 B2 | 1/2010 | Visalli |
| 7,656,321 B2 | 2/2010 | Wang |
| 7,697,915 B2 | 4/2010 | Behzad |
| 7,698,088 B2 | 4/2010 | Sul |
| 7,706,524 B2 | 4/2010 | Zerbe |
| 7,746,764 B2 | 6/2010 | Rawlins et al. |
| 7,787,572 B2 | 8/2010 | Scharf et al. |
| 7,808,456 B2 | 10/2010 | Chen |
| 7,841,909 B2 | 11/2010 | Murray |
| 7,869,497 B2 | 1/2011 | Benvenuto |
| 7,869,546 B2 | 1/2011 | Tsai |
| 7,882,413 B2 | 2/2011 | Chen et al. |
| 7,933,770 B2 | 4/2011 | Kruger et al. |
| 8,000,664 B2 | 8/2011 | Khorram |
| 8,030,999 B2 | 10/2011 | Chatterjee |
| 8,064,535 B2 | 11/2011 | Wiley |
| 8,091,006 B2 | 1/2012 | Prasad et al. |
| 8,106,806 B2 | 1/2012 | Toyomura |
| 8,149,906 B2 | 4/2012 | Saito |
| 8,159,375 B2 | 4/2012 | Abbasfar |
| 8,159,376 B2 | 4/2012 | Abbasfar |
| 8,199,849 B2 | 6/2012 | Oh |
| 8,233,544 B2 | 7/2012 | Bao |
| 8,253,454 B2 | 8/2012 | Lin |
| 8,279,094 B2 | 10/2012 | Abbasfar |
| 8,289,914 B2 | 10/2012 | Li |
| 8,295,250 B2 | 10/2012 | Gorokhov |
| 8,310,389 B1 | 11/2012 | Chui |
| 8,341,492 B2 | 12/2012 | Shen |
| 8,359,445 B2 | 1/2013 | Ware |
| 8,406,315 B2 | 3/2013 | Tsai |
| 8,406,316 B2 | 3/2013 | Sugita |
| 8,429,492 B2 | 4/2013 | Yoon |
| 8,429,495 B2 | 4/2013 | Przybylski |
| 8,437,440 B1 | 5/2013 | Zhang |
| 8,442,099 B1 | 5/2013 | Sederat |
| 8,442,210 B2 | 5/2013 | Zerbe |
| 8,443,223 B2 | 5/2013 | Abbasfar |
| 8,462,891 B2 | 6/2013 | Kizer et al. |
| 8,620,166 B2 | 6/2013 | Dong |
| 8,498,368 B1 | 7/2013 | Husted |
| 8,520,493 B2 | 8/2013 | Goulahsen |
| 8,547,272 B2 | 10/2013 | Nestler et al. |
| 8,578,246 B2 | 11/2013 | Mittelholzer |
| 8,588,280 B2 | 11/2013 | Oh et al. |
| 8,593,305 B1 | 11/2013 | Tajalli et al. |
| 8,602,643 B2 | 12/2013 | Gardiner |
| 8,604,879 B2 | 12/2013 | Mourant |
| 8,638,241 B2 | 1/2014 | Sudhakaran |
| 8,643,437 B2 | 2/2014 | Chiu |
| 8,649,445 B2 | 2/2014 | Cronie |
| 8,649,460 B2 | 2/2014 | Ware |
| 8,649,840 B2 | 2/2014 | Sheppard, Jr. |
| 8,674,861 B2 | 3/2014 | Matsuno |
| 8,687,968 B2 | 4/2014 | Nosaka |
| 8,718,184 B1 | 5/2014 | Cronie |
| 8,755,426 B1 | 6/2014 | Cronie |
| 8,780,687 B2 | 7/2014 | Clausen |
| 8,782,578 B2 | 7/2014 | Tell |
| 8,831,440 B2 | 9/2014 | Yu |
| 8,879,660 B1 | 11/2014 | Peng |
| 8,898,504 B2 | 11/2014 | Baumgartner |
| 8,938,171 B2 | 1/2015 | Tang |
| 8,949,693 B2 | 2/2015 | Ordentlich |

(56) References Cited

U.S. PATENT DOCUMENTS

| | | |
|---|---|---|
| 8,951,072 B2 | 2/2015 | Hashim |
| 8,989,317 B1 | 3/2015 | Holden |
| 9,036,764 B1 | 5/2015 | Hossain |
| 9,069,995 B1 | 6/2015 | Cronie |
| 9,077,386 B1 | 7/2015 | Holden |
| 9,083,576 B1 | 7/2015 | Hormati |
| 9,093,791 B2 | 7/2015 | Liang |
| 9,100,232 B1 | 8/2015 | Hormati |
| 9,148,087 B1 | 9/2015 | Tajalli |
| 9,152,495 B2 | 10/2015 | Losh |
| 9,178,503 B2 | 11/2015 | Hsieh |
| 9,183,085 B1 | 11/2015 | Northcott |
| 9,281,785 B2 | 3/2016 | Sjoland |
| 9,288,082 B1 | 3/2016 | Ulrich |
| 9,288,089 B2 | 3/2016 | Cronie |
| 9,292,716 B2 | 3/2016 | Winoto |
| 9,306,621 B2 | 4/2016 | Zhang |
| 9,331,962 B2 | 5/2016 | Lida |
| 9,362,974 B2 | 6/2016 | Fox |
| 9,363,114 B2 | 6/2016 | Shokrollahi |
| 9,374,250 B1 | 6/2016 | Musah |
| 9,401,828 B2 | 7/2016 | Cronie |
| 9,432,082 B2 | 8/2016 | Ulrich |
| 9,432,298 B1 | 8/2016 | Smith |
| 9,444,654 B2 | 9/2016 | Hormati |
| 9,455,744 B2 | 9/2016 | George |
| 9,455,765 B2 | 9/2016 | Schumacher |
| 9,509,437 B2 | 11/2016 | Shokrollahi |
| 9,544,015 B2 | 1/2017 | Ulrich |
| 2001/0006538 A1 | 7/2001 | Simon et al. |
| 2001/0055344 A1 | 12/2001 | Lee et al. |
| 2002/0034191 A1 | 3/2002 | Shattil |
| 2002/0044316 A1 | 4/2002 | Myers |
| 2002/0057592 A1 | 5/2002 | Robb |
| 2002/0154633 A1 | 10/2002 | Shin |
| 2002/0163881 A1 | 11/2002 | Dhong |
| 2002/0174373 A1 | 11/2002 | Chang |
| 2003/0071745 A1 | 4/2003 | Greenstreet |
| 2003/0086366 A1 | 5/2003 | Branlund |
| 2003/0105908 A1 | 6/2003 | Perino et al. |
| 2003/0146783 A1 | 8/2003 | Bandy et al. |
| 2003/0227841 A1 | 12/2003 | Tateishi et al. |
| 2004/0003336 A1 | 1/2004 | Cypher |
| 2004/0003337 A1 | 1/2004 | Cypher |
| 2004/0057525 A1 | 3/2004 | Rajan et al. |
| 2004/0086059 A1 | 5/2004 | Eroz et al. |
| 2004/0156432 A1 | 8/2004 | Hidaka |
| 2005/0057379 A1 | 3/2005 | Jansson |
| 2005/0135182 A1 | 6/2005 | Perino et al. |
| 2005/0149833 A1 | 7/2005 | Worley |
| 2005/0152385 A1 | 7/2005 | Cioffi |
| 2005/0174841 A1 | 8/2005 | Ho |
| 2005/0213686 A1 | 9/2005 | Love et al. |
| 2005/0286643 A1 | 12/2005 | Ozawa et al. |
| 2006/0115027 A1 | 6/2006 | Srebranig |
| 2006/0126751 A1 | 6/2006 | Bessios |
| 2006/0159005 A1 | 7/2006 | Rawlins et al. |
| 2006/0267048 A1* | 11/2006 | Chen ................ H01L 23/5222 257/208 |
| 2006/0269005 A1 | 11/2006 | Laroia et al. |
| 2007/0030796 A1 | 2/2007 | Green |
| 2007/0188367 A1 | 8/2007 | Yamada |
| 2007/0260965 A1 | 11/2007 | Schmidt et al. |
| 2007/0263711 A1 | 11/2007 | Kramer et al. |
| 2007/0265533 A1 | 11/2007 | Tran |
| 2007/0283210 A1 | 12/2007 | Prasad et al. |
| 2008/0007367 A1 | 1/2008 | Kim |
| 2008/0104374 A1 | 5/2008 | Mohamed |
| 2008/0159448 A1 | 7/2008 | Anim-Appiah |
| 2008/0169846 A1 | 7/2008 | Lan et al. |
| 2008/0273623 A1 | 11/2008 | Chung et al. |
| 2008/0284524 A1 | 11/2008 | Kushiyama |
| 2008/0317188 A1 | 12/2008 | Staszewski |
| 2009/0059782 A1 | 3/2009 | Cole |
| 2009/0092196 A1 | 4/2009 | Okunev |
| 2009/0132758 A1 | 5/2009 | Jiang |
| 2009/0154500 A1 | 6/2009 | Diab et al. |
| 2009/0163612 A1 | 6/2009 | Brady et al. |
| 2009/0185636 A1 | 7/2009 | Palotai et al. |
| 2009/0193159 A1 | 7/2009 | Li |
| 2009/0212861 A1 | 8/2009 | Lim et al. |
| 2009/0228767 A1 | 9/2009 | Oh et al. |
| 2009/0257542 A1 | 10/2009 | Evans et al. |
| 2009/0275236 A1* | 11/2009 | Murray ................ H05K 1/0228 439/620.21 |
| 2009/0323864 A1 | 12/2009 | Tired |
| 2010/0020898 A1 | 1/2010 | Stojanovic |
| 2010/0023838 A1 | 1/2010 | Shen |
| 2010/0046644 A1 | 2/2010 | Mazet |
| 2010/0104047 A1 | 4/2010 | Chen et al. |
| 2010/0180143 A1 | 7/2010 | Ware et al. |
| 2010/0205506 A1 | 8/2010 | Hara |
| 2010/0215112 A1 | 8/2010 | Tsai |
| 2010/0296550 A1 | 11/2010 | Abou Rjeily |
| 2010/0296556 A1 | 11/2010 | Rave |
| 2011/0014865 A1 | 1/2011 | Seo et al. |
| 2011/0051854 A1 | 3/2011 | Kizer et al. |
| 2011/0072330 A1 | 3/2011 | Kolze |
| 2011/0084737 A1 | 4/2011 | Oh et al. |
| 2011/0127990 A1 | 6/2011 | Wilson et al. |
| 2011/0235501 A1 | 9/2011 | Goulahsen |
| 2011/0268225 A1 | 11/2011 | Cronie et al. |
| 2011/0299555 A1 | 12/2011 | Cronie et al. |
| 2011/0302478 A1 | 12/2011 | Cronie et al. |
| 2011/0317559 A1 | 12/2011 | Kern et al. |
| 2012/0063291 A1 | 3/2012 | Hsueh |
| 2012/0152901 A1* | 6/2012 | Nagorny ................ H01J 37/321 216/68 |
| 2012/0161945 A1 | 6/2012 | Single |
| 2012/0163491 A1* | 6/2012 | Clausen ................ H04B 3/32 375/285 |
| 2012/0213299 A1 | 8/2012 | Cronie et al. |
| 2013/0010892 A1 | 1/2013 | Cronie et al. |
| 2013/0051162 A1 | 2/2013 | Amirkhany et al. |
| 2013/0195175 A1 | 8/2013 | Pan |
| 2013/0259113 A1 | 10/2013 | Kumar |
| 2013/0266047 A1* | 10/2013 | Sudhakaran ............ H04L 25/14 375/219 |
| 2014/0016724 A1 | 1/2014 | Cronie |
| 2014/0073196 A1* | 3/2014 | Hashim ................ H01R 24/00 439/676 |
| 2014/0127943 A1* | 5/2014 | Liang ................ H01R 13/6464 439/620.23 |
| 2014/0226455 A1* | 8/2014 | Schumacher ...... H01R 13/6461 370/201 |
| 2014/0254730 A1 | 9/2014 | Kim et al. |
| 2015/0010044 A1 | 1/2015 | Zhang |
| 2015/0078479 A1 | 3/2015 | Whitby-Strevens |
| 2015/0146771 A1 | 5/2015 | Walter |
| 2015/0222458 A1 | 8/2015 | Hormati |
| 2015/0249559 A1 | 9/2015 | Shokrollahi |
| 2015/0333940 A1 | 11/2015 | Shokrollahi |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

International Search Report and Written Opinion of the International Searching Authority, mailed Jul. 14, 2011 in International Patent Application S.N. PCT/EP2011/002170, 10 pages.

Healey, A., et al., "A Comparison of 25 Gbps NRZ & PAM-4 Modulation used in Legacy & Premium Backplane Channels", DesignCon 2012, 16 pages.

(56) References Cited

OTHER PUBLICATIONS

International Search Report for PCT/US2014/053563, dated Nov. 11, 2014, 2 pages.

Clayton, P., "Introduction to Electromagnetic Compatibility", Wiley-Interscience, 2006.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.

Skliar et al., A Method For the Analysis of Signals: the Square-Wave Method, Mar. 2008, Revista de Matematica: Teoria y Aplicationes, pp. 09-129.

International Search Report and Written Opinion from PCT/US2014/034220 mailed Aug. 21, 2014.

International Search Report and Written Opinion for PCT/US14/052986 mailed Nov. 24, 2014.

Burr, "Spherical Codes for M-ARY Code Shift Keying", University of York, Apr. 2, 1989, pp. 67-72, United Kingdom.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallani, L., et al., "Transmission Time Analysis for the Parallel Asynchronous Communication Scheme", IEEE Tranactions on Computers, vol. 52, No. 5, May 2003, pp. 558-571.

International Search Report and Written Opinion for PCT/EP2012/052767 mailed May 11, 2012.

International Search Report and Written Opinion for PCT/EP2011/059279 mailed Sep. 22, 2011.

International Search Report and Written Opinion for PCT/EP2011/074219 mailed Jul. 4, 2012.

Notification of Transmittal of The International Search Report and The Written Opinion of the International Searching Authority, or The Declaration for PCT/EP2013/002681, dated Feb. 25, 2014, 15 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Abbasfar, A., "Generalized Differential Vector Signaling", IEEE International Conference on Communications, ICC '09, (Jun. 14, 2009), pp. 1-5.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Cheng, W., "Memory Bus Encoding for Low Power: A Tutorial", Quality Electronic Design, IEEE, International Symposium on Mar. 26-28, 2001, pp. 199-204, Piscataway, NJ.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Notification of Transmittal of International Search Report and The Written Opinion of the International Searching Authority, for PCT/US2015/018363, mailed Jun. 18, 2015, 13 pages.

Counts, L., et al., "One-Chip Slide Rule Works with Logs, Antilogs for Real-Time Processing," Analog Devices Computational Products 6, Reprinted from Electronic Design, May 2, 1985, 7 pages.

Design Brief 208 Using the Anadigm Multiplier CAM, Copyright 2002 Anadigm, 6 pages.

Grahame, J., "Vintage Analog Computer Kits," posted on Aug. 25, 2006 in Classic Computing, 2 pages, http.//www.retrothing.com/2006/08/classic_analog_html.

Schneider, J., et al., "ELEC301 Project: Building an Analog Computer," Dec. 19, 1999, 8 pages, http://www.clear.rice.edu/elec301/Projects99/anlgcomp/.

Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.

"Introduction to: Analog Computers and the DSPACE System," Course Material ECE 5230 Spring 2008, Utah State University, www.coursehero.com, 12 pages.

Notification of Transmittal of The International Search Report and The Written Opinion of the International Searching Authority, or the Declaration, for PCT/US2014/015840, dated May 20, 2014. 11 pages.

Notification of Transmittal of The International Search Report and The Written Opinion of the International Searching Authority, or the Declaration, for PCT/US2014/043965, dated Oct. 22, 2014, 10 pages.

Notification of Transmittal of The International Search Report and The Written Opinion of the International Searching Authority, or The Declaration, dated Mar. 3, 2015, for PCT/US2014/066893, 9 pages.

International Preliminary Report on Patentability for PCT/US2014/015840, dated Aug. 11, 2015, 7 pages.

Jiang, A., et al., "Rank Modulation for Flash Memories", IEEE Transactions of Information Theory, Jun. 2006, vol. 55, No. 6, pp. 2659-2673.

Zouhair Ben-Neticha et al, "The 'streTched''-Golay and other codes for high-SNR finite-delay quantization of the Gaussian source at 1/2 Bit per sample, IEEE Transactions on Communications, vol. 38, No. 12 Dec. 1, 1990, pp. 2089-2093, XP000203339, ISSN: 0090-6678, DOI: 10.1109/26.64647.

Oh, et al., Pseudo-Differential Vector Signaling for Noise Reduction in Single-Ended Signaling, DesignCon 2009.

Loh, M., et al., "A 3x9 Gb/s Shared, All-Digital CDR for High-Speed, High-Density I/O", Matthew Loh, IEEE Journal of Solid-State Circuits, Vo. 47, No. 3, Mar. 2012.

Notification of Transmittal of the International Search Report and the Written Opinion of the International Searching Authority, or the Declaration, for PCT/US2015/043463, dated Oct. 16, 2015, 8 pages.

International Preliminary Report on Patentabilityfor PCT/US2014/034220, dated Oct. 20, 2015, 5 pages.

Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.

Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.

Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.

Notification of Transmittal of the International Search Report and The Written Opinion of the International Searching Authority, or the Declaration, for PCT/US2015/039952, dated Sep. 23, 2015, 8 pages.

Notification of Transmittal of the International Search Report and the Written Opinion of the International Searching Authority, or the Declaration, for PCT/US2015/041161, dated Oct. 7, 2015, 8 pages.

Notification of Transmittal of the International Search Report and the Written Opinion of the International Searching Authority, or the Declaration, dated Feb. 15, 2017, 10 pages.

Notification of Transmittal of the International Search Report and the Written Opinion of the International Searching Authority, or the Declaration., for PCT/US17/14997, dated Apr. 7, 2017.

* cited by examiner

METHODS AND SYSTEMS FOR REDUCTION OF NEAREST-NEIGHBOR CROSSTALK

This application claims priority to U.S. Provisional Application Ser. 61/934,508, filed Jan. 31, 2014, which is incorporated herein by reference.

The following are incorporated herein by reference: U.S. Pat. No. 8,442,099, Crosstalk cancellation for a common-mode channel, naming Hossein Sederat, issued May 14, 2013 ["Sederat"]; European Patent EP20392221 B1, Crosstalk cancellation using load impedance measurements, naming Michael Holmstrom, Sven Mattisson, and Bengt Edholm, issued Feb. 20, 2013 ["Holmstrom"]; U.S. Patent Application Publication No. 2008/0159448, System and method for crosstalk cancellation, naming Kofi Dankwa Anim-Appiah and Nirmal C. Warke. published Jul. 3, 2008 ["Dankwa"]; and U.S. Patent Application Publication No. 2012/0063291, CDMA-based crosstalk cancellation for on-chip global high-speed links, naming Tzu-Chien Hsueh and Sudhakar Pamarti, published Mar. 15, 2012 ["Hsueh"].

BACKGROUND OF THE INVENTION

One of the sources of error in communications links consisting of multiple wires (i.e., multi-wire communications links, or multi-wire communications systems more generally) is crosstalk between the wires. Crosstalk is the coupling of energy from one line to another when one wire transitions from one state to another. Such a transition can have an inductive or a capacitive crosstalk effect on the neighboring wires. Accordingly, the two forms of crosstalk are called inductive and capacitive crosstalk. Inductive crosstalk is caused by coupling of the magnetic fields of the wires, whereas capacitive crosstalk is caused by coupling of the electric fields.

Wires in a communication link are transmission lines, which may be modeled as distributed networks of series inductances and parallel capacitances. Inductive crosstalk as illustrated in FIG. 9A is caused by mutual inductance Lm between the distributed inductances of driven wire 950 and "victim" wire 960. A current through the driven conductor causes a current $I_{LM}$ in the opposite direction in the victim conductor. The strength of this current depends on the derivative of the transition change and the mutual inductance between the wires.

Capacitive crosstalk as illustrated in FIG. 9B is caused by mutual capacitance Cm between driven wire 950 and victim wire 960. Changes in the voltage between conductors results in a current $I_{CM}$ proportional to the rate of the change and the mutual capacitance between the conductors. Thus, the induction process induces a current that flows in the direction opposite to the direction of the original signal transition, while the capacitive process induces current that moves in both directions.

SUMMARY OF THE INVENTION

The total crosstalk caused on the victim line (or wire) at the near end is the sum of $I_{CM}$ and $I_{LM}$. The total crosstalk caused on the victim at the far end is the difference $I_{CM}$-$I_{LM}$. On a Printed Circuit Board (PCB), the far-end crosstalk is typically negative, since the inductive current is typically larger than the capacitive current.

Disclosed herein are methods and systems incorporating—and of constructing—signaling schemes implementing codes that produce reduced crosstalk among parallel conductors of a communications interconnection. Unlike previously known crosstalk-reduction methods requiring modification of the analog transmit driver and/or analog receiver, the present methods and systems operate at the encoding/decoding level, simplifying the incorporation into existing designs.

DETAILED DESCRIPTION OF THE INVENTION

Crosstalk can have very adverse effects on the integrity of signals transmitted at high speed on a multiconductor transmission line. An example is described in the context of a system in which a memory unit is connected to a processor via 8 parallel conductors laid out in close proximity to one another. The S-parameter matrix of the entire transmission line from pad to pad has been extracted using network analyzers. As one non-limiting example of a practical embodiment, signals are transmitted on these wires using a voltage source at 1.2 V. Signals are transmitted by keeping a common mode voltage of 0.6 V, and swinging around this common mode voltage with a swing of 150 mV in each direction. The voltage of 600+150 mV thus corresponds to a "1," whereas the voltage of 600-150 mV corresponds to a "-1". The detection of the signals is done via comparators on each wire that compare the value received against the common mode voltage of 0.6 V. The time period for which one simultaneously transmitted set of signals is sent is one 'unit interval' of transmission, with the eight wire values communicated in that unit interval generally representing one codeword of the communication. As will be understood by one familiar with the art, the number of wires in the communications channel may be different than the number of symbols in the code used over that channel, as in a subsequent example where 19 codewords are communicated over a channel in 20 consecutive unit intervals. Thus, for purposes of generality, the term "wire sequence" may be used to describe a codeword or portion of a codeword communicated over the wires of a communications channel.

Figure 7:
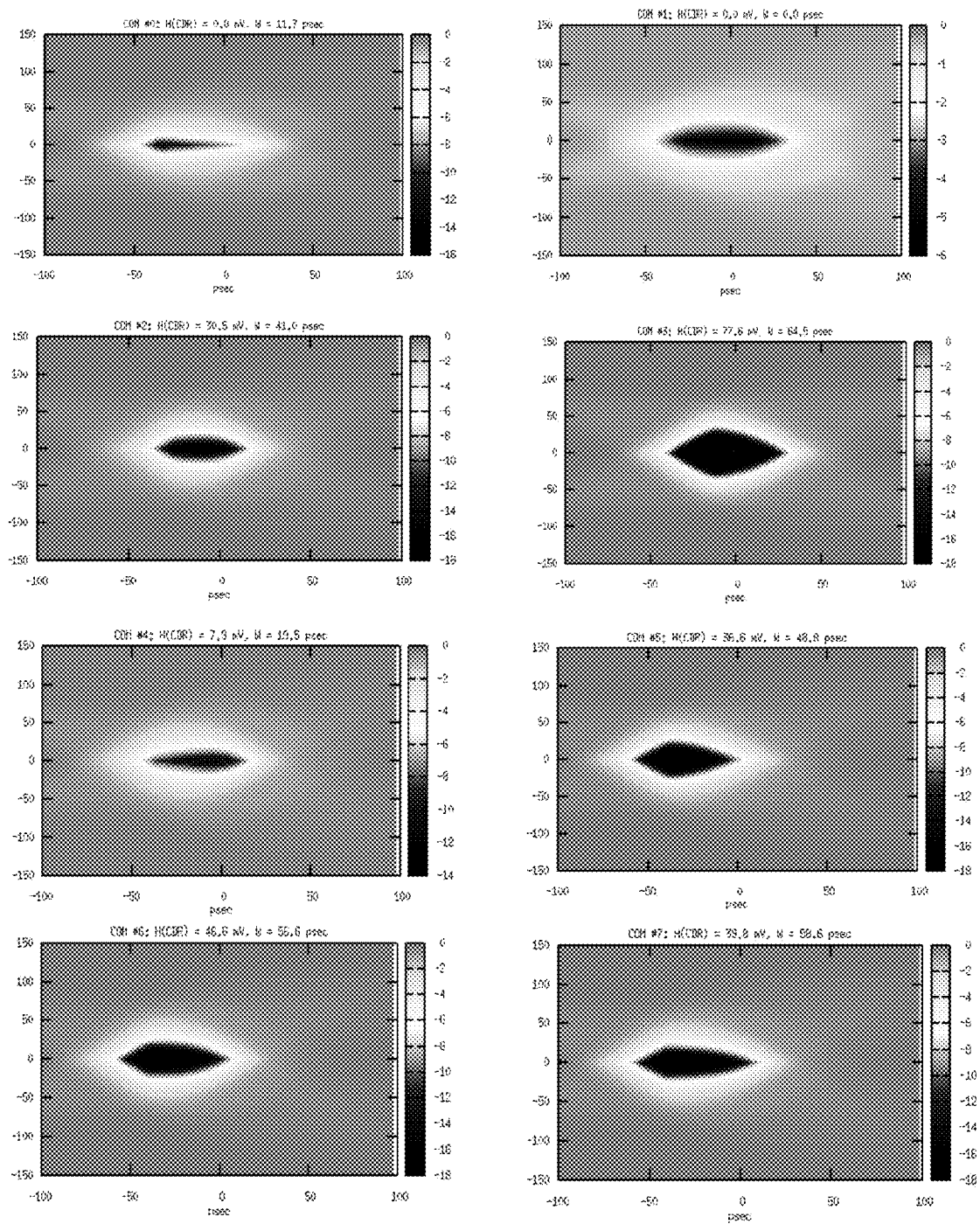
FIG. 7 illustrates eye diagrams for an example communications system with crosstalk.

The eye diagrams shown in FIG. 7 were produced by a software simulation of the example 8-wire communications system at a wire data rate of 8 Gbps using a statistical eye display application. The simulated communications system incorporates a 3-tap Transmit FIR, a Receiver CTLE, and a 1-tap DFE for signal equalization. The effects of SSO or reference noise have not been taken into account.

Figure 8:
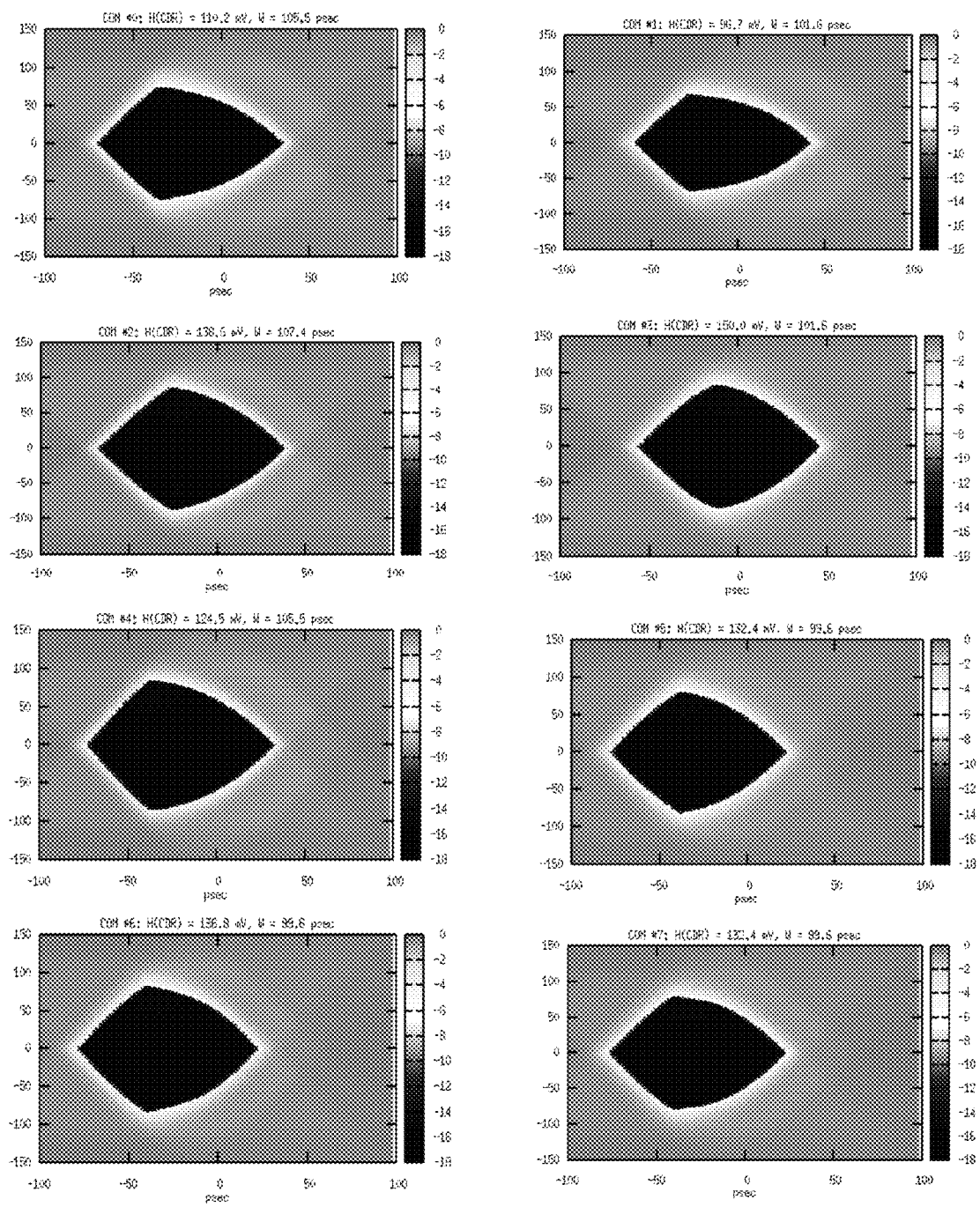
FIG. 8 illustrates eye diagrams for an example communications system with crosstalk and the described crosstalk cancellation.
Figure 9A:
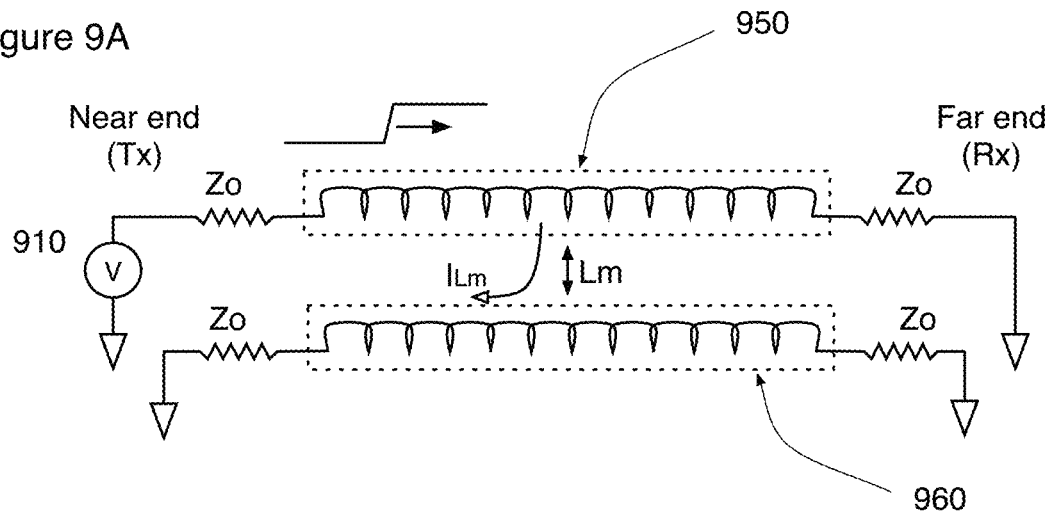
FIGS. 9A and 9B are models for crosstalk between wires as inductive and capacitive coupling components.
Figure 9B:
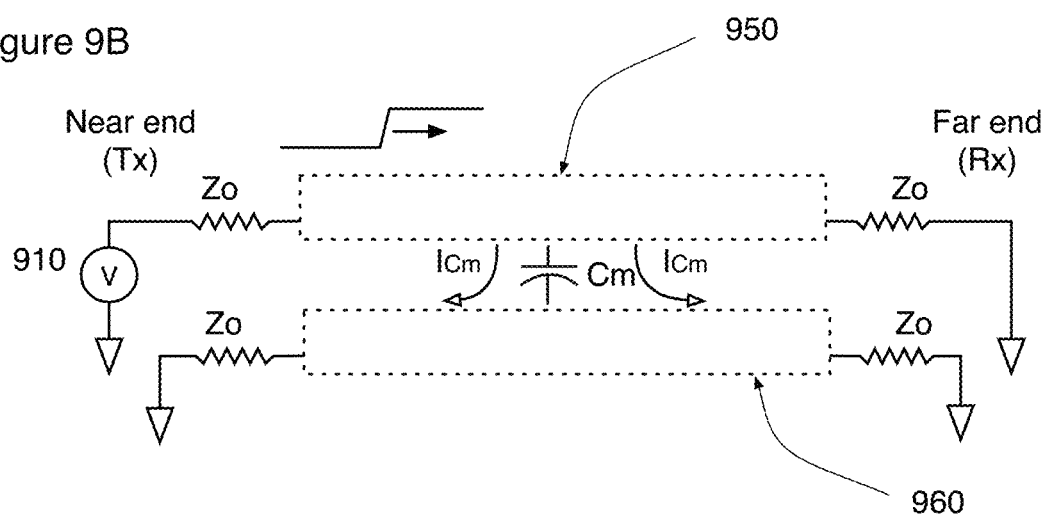

A completely different picture is obtained when the effect of crosstalk is cancelled out, as shown by the eye diagrams of FIG. 8. This is done in software by disregarding in the S-parameters the contribution of signals traversing between non-like ports. To obtain a fair comparison, the same equalization settings were used in the simulations of FIGS. 7 and 8.

Table 1 summarizes the horizontal and the vertical sizes of the eight eye diagrams shown in FIGS. 7 and 8, illustrating how dramatic the effect of crosstalk can be, as is well known to those of skill in the art.

TABLE 1

| Eye width (psec) | | Eye height (mV) | |
|---|---|---|---|
| xtlk | No xtlk | xtlk | No xtlk |
| 11.7 | 105.5 | 0 | 110.2 |
| 0 | 101.6 | 0 | 96.7 |
| 41 | 107.4 | 30.5 | 138.6 |
| 64.5 | 101.6 | 77.6 | 150 |
| 19.5 | 105.5 | 7.9 | 124.5 |
| 48.8 | 99.6 | 36.6 | 132.4 |
| 56.6 | 99.6 | 46.6 | 136.8 |
| 58.6 | 99.6 | 39.8 | 132.4 |

Because of its importance, crosstalk cancellation or reduction has been the subject of much investigation. One known method is to try to minimize the effect of crosstalk by careful layout of the wires in a multiconductor transmission line, e.g., by placing them further apart, or by introducing shielding between the wires. Where this is not sufficient, or such countermeasures are not possible due to lack of physical space, analog circuitry can be employed to reduce the effect of crosstalk. For example, Sederat describes analog components designed to reduce crosstalk between signals transmitted on differential lanes. Holstrom describes a method for crosstalk cancellation using load-impedance measurements (albeit for lower-speed signals). Other methods include the addition of the perturbation of a signal to the signals of the other wires, as described for example in the G.993.5 standard of the International Telecommunications Union. This method, called pre-coding, is done with analog circuitry embedded into the drivers of the transmission system. Dankwa describes yet another method of crosstalk cancellation in analog circuitry using a measurement of the channel response to estimate noise coefficients, and using these coefficients for cancelling crosstalk in neighboring wires. [Hsueh] uses CDMA techniques to overcome crosstalk in on-chip communications. Such techniques are used directly in the transmitter, which again requires analog circuitry to be added to that needed for the transmission of the data.

In general, most attempts to cancel or reduce crosstalk in a high-speed-communication system need to be employed directly in the analog circuitry needed for driving the signals on the wires of the multi-transmission line, and in several cases in the analog circuitry needed for detection as well. Many of these methods require training to learn the channel characteristics, as this is needed for optimal operation of these systems. As a result, many designers of high-speed-transmission lines, such as those designing the I/O of memory systems and subsystems, may decide not to use such crosstalk-cancellation circuitry for reasons of cost, delay, and lack of optimal characterization of the circuitry needed for a reproduction of the same in the billions, perhaps among other reasons. Moreover, in many cases, the driver and the receiver circuitry is used across multiple products, some of which may not require heavy or even any crosstalk cancellation. Adding a cancellation unit to such drivers may therefore unnecessarily increase the cost.

What is required is a very lightweight design that is capable of reducing the effect of crosstalk, that can be included with ease in existing product lines, and that can be turned off and on with ease depending on, e.g., what product line is in need of crosstalk cancellation. The present methods and systems provide such a design.

Figure 1:
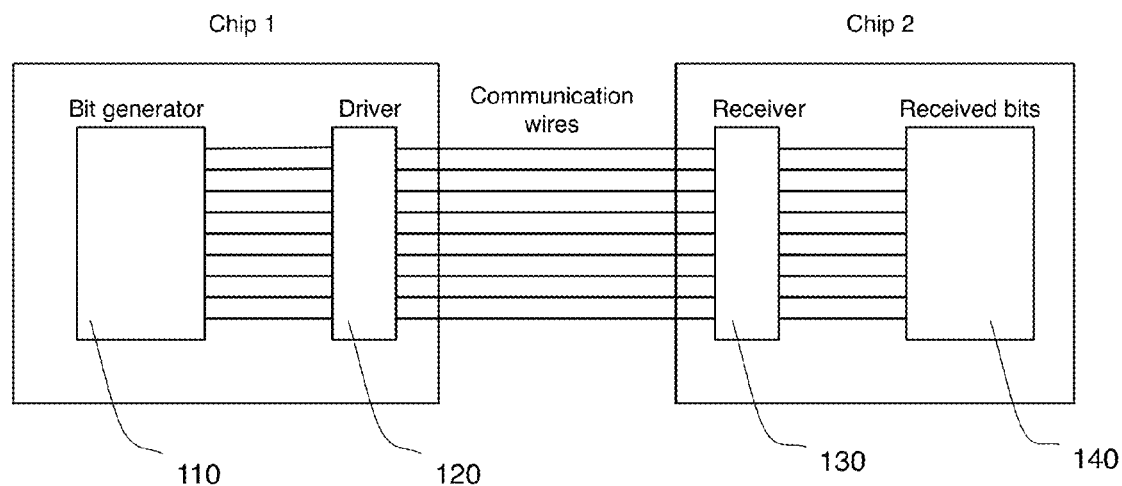
FIG. 1 is a block diagram of a prior art communications system utilizing multiple communication wires to connect a transmitting integrated circuit chip 1 to a receiving integrated circuit chip 2.

FIG. 1 is a block diagram of a prior art chip-to-chip link. In this system, data is sent between two chips, called Chip 1 and Chip 2, via a set of communication wires. Chip 1 contains a Bit generator 110, which as one example might be a serializer connected to a wider host bus delivering bits, though the existence of a serializer is not required in this application. The bits are delivered to the Driver 120, which is typically implemented using analog circuitry. The Driver puts voltages/currents on the communication wires according to the bits it receives. Chip 2 has a Receiver 130, also typically implemented in analog, which infers the bits communicated on the communication wires by sensing said wires, and possibly performing additional tasks such as equalization, clock-and-data recovery, and more. The output of the Receiver is the Received digital bits 140.

Figure 2:
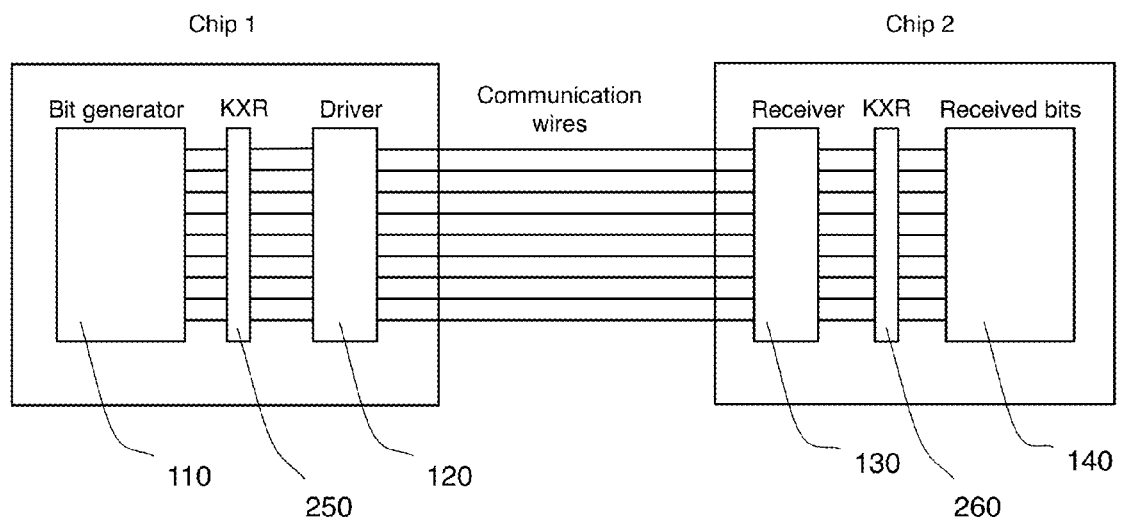
FIG. 2 is a block diagram of an embodiment incorporating Crosstalk Reduction (KXR) elements in transmitting chip 1 and receiving chip 2.

FIG. 2 is a block diagram of a chip-to-chip communication system according to at least one embodiment. In this example, another unit called KXR (Kandou Crosstalk Reducer) is added between the Bit generator and the Driver in Chip 1 as shown as 250, and after the Receiver in Chip 2 as shown as 260. The KXR in Chip 1 encodes the incoming digital data from the Bit generator and pass the new bits to the Driver. The operation of various embodiments of the KXR encoder is described later in this disclosure. The KXR in Chip 2 decodes the received bits back to their original form. In some embodiments, both of these units are implemented in digital logic, and there is no out-of-band communication between the KXR units and the analog parts of the corresponding chips, making adoption of the present methods and systems much simpler for vendors of systems that employ legacy chip-to-chip communication.

KXR Operation

The main function of KXR is reduction of inductive or capacitive crosstalk on the communication wires. This is done at least in part by reducing "nearest aggressor crosstalk", i.e., crosstalk caused by the nearest neighboring wires. This is accomplished at least in part by disallowing certain transitions on the wires. Since this will reduce the number of possibilities of bits on the communication wires compared to the unrestricted case, KXR typically leads to some data-rate loss, which is discussed below. In the following examples, the label "(N,w)-KXR" refers to a K×R system receiving an integer between 0 and N−1, and outputting a w-dimensional bit vector wherein w is thus the number of communication wires. The input integer may be given to KXR from the Bit generator as a unique sequence of bits, such as a binary expansion of that integer.

As mentioned, in operation, KXR disallows certain transitions on the wires, thereby reducing the worst-case crosstalk effect caused by the nearest aggressors. When considering inductive crosstalk, worst-case crosstalk on a victim wire is obtained when that wire is high, or is pulling high, while its two neighboring wires also pull high. Similarly, the wire could be low, or could pull low, while its two neighboring wires also pull low. This is because a wire pulling high causes a negative voltage on its neighboring wires. Two wires pulling high cause twice the negative voltage on the middle wire, and if the final value of the middle wire is high, then the negative voltage will cause a degradation of the signal quality.

Similarly, in the case of capacitive crosstalk, the worst case is obtained when a wire is pulling high (low), or remains high (low), while its two neighboring wires pull low (high). Based on these observations, we call any of the transitions

111→000, 101→000, 000→111, 010→111 on three consecutive wires "inductively bad" and any of the transitions

111→010, 101→010, 000→101, 010→101 on three consecutive wires "capacitively bad". KXR avoids (inductively or capacitively) bad transitions on any set of three consecutive wires.

Figure 3:
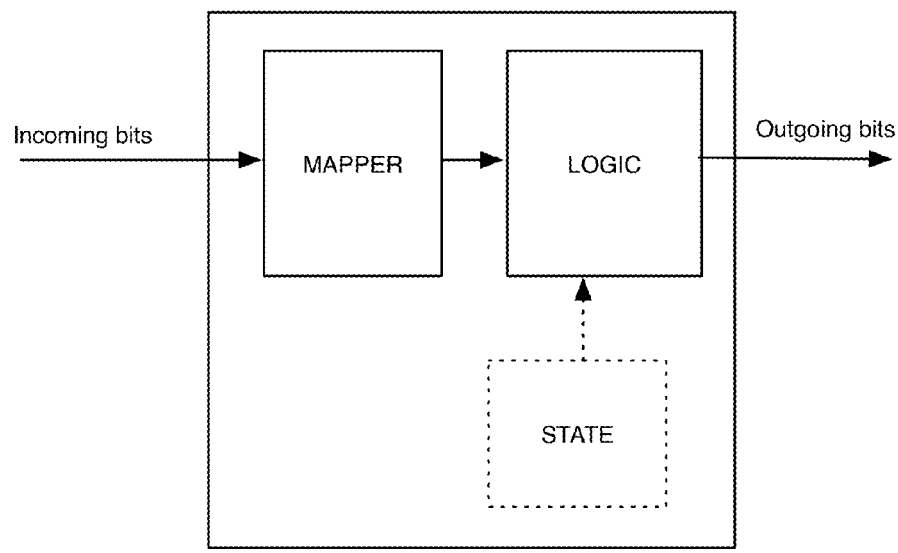
FIG. 3 is a block diagram of a logic device performing a transformation of an incoming bit stream into an outgoing bit stream, optionally incorporating internal state.

The KXR unit is shown in the block diagram of FIG. 3. It comprises a logic element (an encoder or a decoder), and a possible STATE set consisting of flip-flops that store state information from one transmission to the next. The encoder determines the outgoing bits based on the incoming bits and the information provided by the stored states. The KXR unit may also comprise another switch that changes the behavior of the unit depending on whether inductive or capacitive crosstalk is to be reduced.

Various embodiments of the KXR unit will now be described and simulation results presented that show the positive effect of KXR on crosstalk reduction.

Stateless Encoding

The first described set of embodiments of KXR units have no state information. In these embodiments, no additional controls need to be provided to the KXR unit to reset state bits after periods of inactivity of the link. (The alternative would be to memorize the latest state, which would lead to unnecessary power consumption).

In a stateless encoder, the result of the encoding needs to be a vector that does not contain 111 or 000 as a consecutive substring (in case of inductive crosstalk), or that does not contain 101 or 010 (in case of capacitive crosstalk). To illustrate, note that in the case of inductive crosstalk, the target of any bad transition is either a string 111 or a string 000 on three consecutive wires; avoiding these will therefore ensure that there are no bad transitions. On the other hand, if for example 111 is the result of a transition on three consecutive wires, it is possible to have had a 010 just prior to that transition, which means that a worst-case nearest-neighbor inductive crosstalk event has taken place. Not having a 111 (and a 000) subsequence is therefore necessary and sufficient for a stateless KXR encoder to function properly when worst-case inductive crosstalk events are to be avoided. A similar reasoning is valid for the case of capacitive crosstalk.

Example 1: 3 Wires

An embodiment of an encoder and a decoder are now described for a stateless (6,3)-KXR. In this case, the output of the KXR unit can only be one of the following vectors:
(1,1,0), (1,0,1), (1,0,0), (0,0,1). (0,1,0), (0,1,1).

Given an integer N between 0 and 5 represented as a sequence of bits (a,b,c) with a&b=0 (so, the integer is for example 4a+2b+c), the following may be performed:

PROCEDURE SL-ENC3 (Stateless encoder on 3 wires):
Output the bit-sequence (a⊕(b&c)), b⊕c, ¬c, where & is the logical AND operation, ⊕ is the XOR operation, and ¬c is the complement of the bit c.

It can be seen that this encoding ensures that no two different 3-bit inputs will produce the same output bit-sequence. Many other forms of encoding are possible as well, for example one giving the bits a, b, c&(a⊕b)|NOR(a,b) where | is the logical OR, and NOR is the NOR function (Not-OR).

The decoder is given as:
PROCEDURE SL-DEC3 (Stateless decoder on 3 wires):
Given three bits x,y,z, the decoder outputs the bits x⊕NOR(y, z), ¬y⊕z, ¬z.

In the second case, the output bits are x, y, z&(x⊕y)|NOR(x,y).

Figure 4:
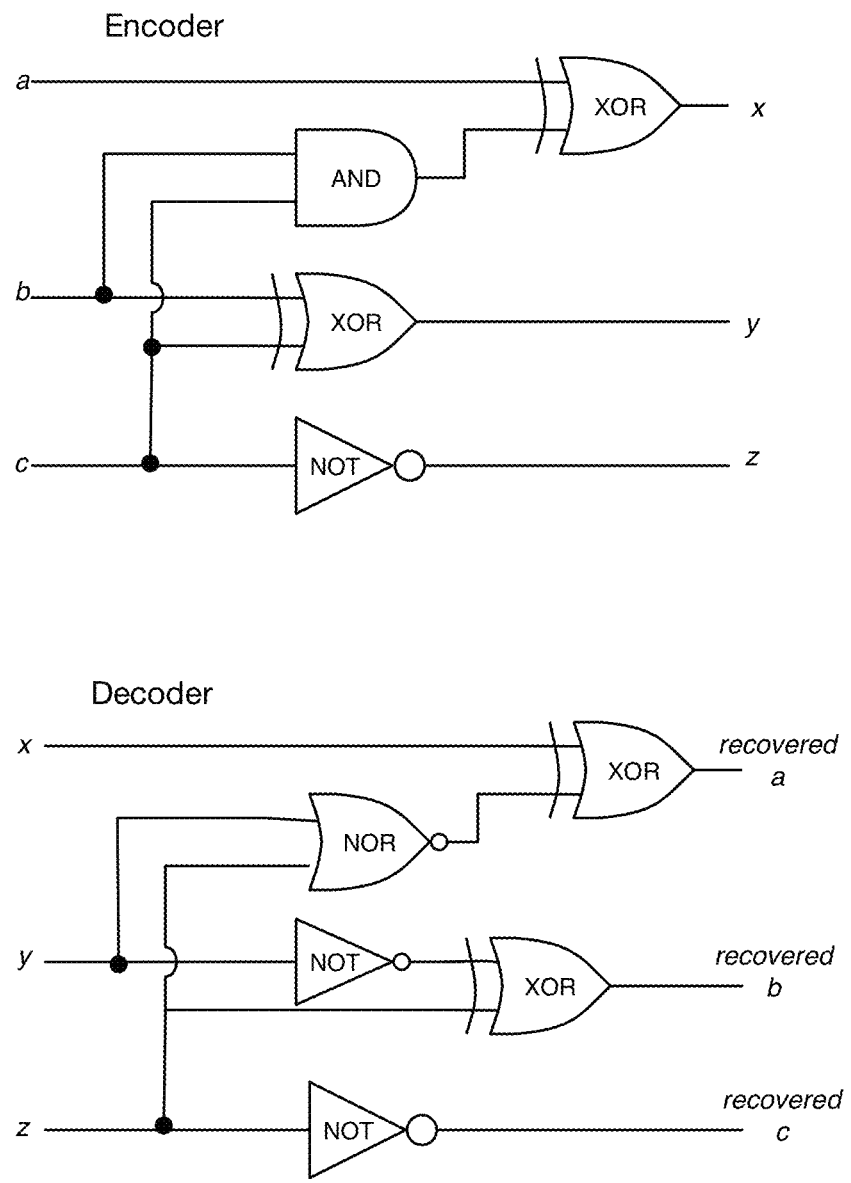
FIG. 4 is a circuit diagram of one example of a transformation.

As an example of a specific embodiment, FIG. 4 shows a logic diagram for the encoder and the decoder in the first case, where a, b, c are the input value, x, y, z are the output bits of the encoder, and the output of the decoder are recovered a, recovered b, recovered c.

One familiar with the art will be well aware of numerous methods to map input values using a mapper as shown in FIG. 3 to generate a constrained range as represented by N above, including use of modulus arithmetic, mapping table, etc. which may be applied in combination with the present invention. In one such example, a block conversion from a base 2 modulus to base 6 modulus is used to change the modulus of the number. In a S-wire example, the modulus encoder recevies 5 bits (32 combinations possible) and outputs two sets of three bits (having 36 total possible combinations is 36), each set of three bits being a binary value of an integer in the range 0-5.

In some embodiments, a method comprises: receiving a set of input data bits; generating a plurality of sets of modulus-converted data bits; selecting a cross-talk reduction codeword vector from a set of crosstalk reduction codeword vectors, wherein each of the crosstalk reduction codeword vectors eliminates patterns of adjacent vector elements associated with either an inductive or capacitive constructive interference; and transmitting the selected crosstalk reduction codeword vector on a multi-wire system. The method may also utilize a set of three wires including a first wire, second wire, and third wire, and the inductive constructive interference comprises transitions where signal levels on the first wire and third wire transition to the same signal level of the second wire, and capacitive constructive interference comprises signal levels on the first wire and third wire transition to an opposite signal level of the second wire. The method may utilize a system wherein the recovered encoded set of data is output from the multi-wire system. The encoding may be performed in a stateless manner, where each crosstalk reduction codeword vector selected based only on the sets of modulus-converted data bits to be encoded. Alternatively, the encoding may be performed in a stateful manner, each crosstalk reduction codeword vector selected based on both the sets of modulus converted data bits to be encoded and at least one previous operation of the encoder.

A further embodiment may include a system comprising: a plurality of signal conductors for receiving a set of input data; a bit generator connected to the signal conductors to receive the input data and form a set of modulus converted data bits; a logic encoding circuit connected to the bit generator used to form a set of crosstalk reduction codeword vectors based at least in part on the set of modulus converted data bits, wherein each crosstalk reduction codeword vector in the set of crosstalk reduction codeword vectors eliminates patterns of adjacent vector elements associated with either an inductive or capacitive constructive interference; and a transmit driver emitting crosstalk reduction codewords onto a multi-wire transmission bus. The system may further comprising a logic decoding receiver to decode the crosstalk reduction codeword vectors received from the multi-wire transmission bus to recover the sets of modulus converted data bits. The system may utilize a multi-wire transmission bus containing at least 3 wires. The set of crosstalk reduction codeword vectors is based on the modulus converted data bits and at least one of a previous encoding and previous modulus converted data bit.

Example 2: 4 Wires

An embodiment of an encoder and a decoder are now described for a stateless (10,4)-KXR. In this case, the output of the KXR unit can only be one of the following 5 vectors or their complements:

(1,1,0,1), (1,0,1,1), (1,0,0,1), (1,1,0,0), (1,0,1,0).

The following algorithm takes care of the encoding: given 4 bits a, b, c, d corresponding to an integer A between 0 and 9 with a being the most significant bit, the following steps are performed:

PROCEDURE SL-ENC4:
IF (A<4) THEN
    Output (c, c, ¬ c, d)
ELSE
    Output (d, ¬ d, ¬ b⊕(d&c), d⊕c).

One implementation of a comparable KXR decoder could perform the following procedure: Given bits x, y, z, u coming out of the receiver, the following steps are performed:

PROCEDURE SL-DEC4:
IF (x y) THEN
    Output (0,0,x,u)
ELSE
    Output ((z⊕(x&(¬ u)), ¬ (z⊕(x&(¬ u)), x⊕u, x).

Note that in the first case, error checking could be performed since in this case z must be ¬x).

Example 3: 5 Wires

An encoder and a decoder are now described for a stateless (16,5)-KXR. In this case, the output of the KXR unit can only be one of the following eight vectors or their complements:

(1,1,0,1,1), (1,1,0,1,0), (1,1,0,0,1), (1,0,1,1,0),
(1,0,1,0,1), (1,0,0,1,1), (1,0,1,0,0), (1,0,0,1,0)

The following algorithm takes care of the encoding: given 4 bits a, b, c, d corresponding to an integer A between 0 and 15, with a being the most significant bit, the following steps are performed:

PROCEDURE SL-ENC5:
IF (A<10) THEN
    Apply SL-ENC4 to (a,b,c,d) and denote output by (x,y,u,z). Output (¬ x, x,y,u,z).
ELSE
    Set A:=A-10
    Apply SL-ENC3 to N and denote the output by (y,u,z).
        Output (¬ y, ¬ y, y, u, z).

The decoder could implement the following algorithm for input bits x, y, u, z, v:

PROCEDURE SL-DEC5:
IF (x=y) THEN
    Apply SL-DEC3 to (u,z,v). If the output is (a,b,c), then output the binary expansion of 10+4a+2b+c.
ELSE
    Apply SL-DEC4 to (y,u,z,v) and return its output.

Figure 10:
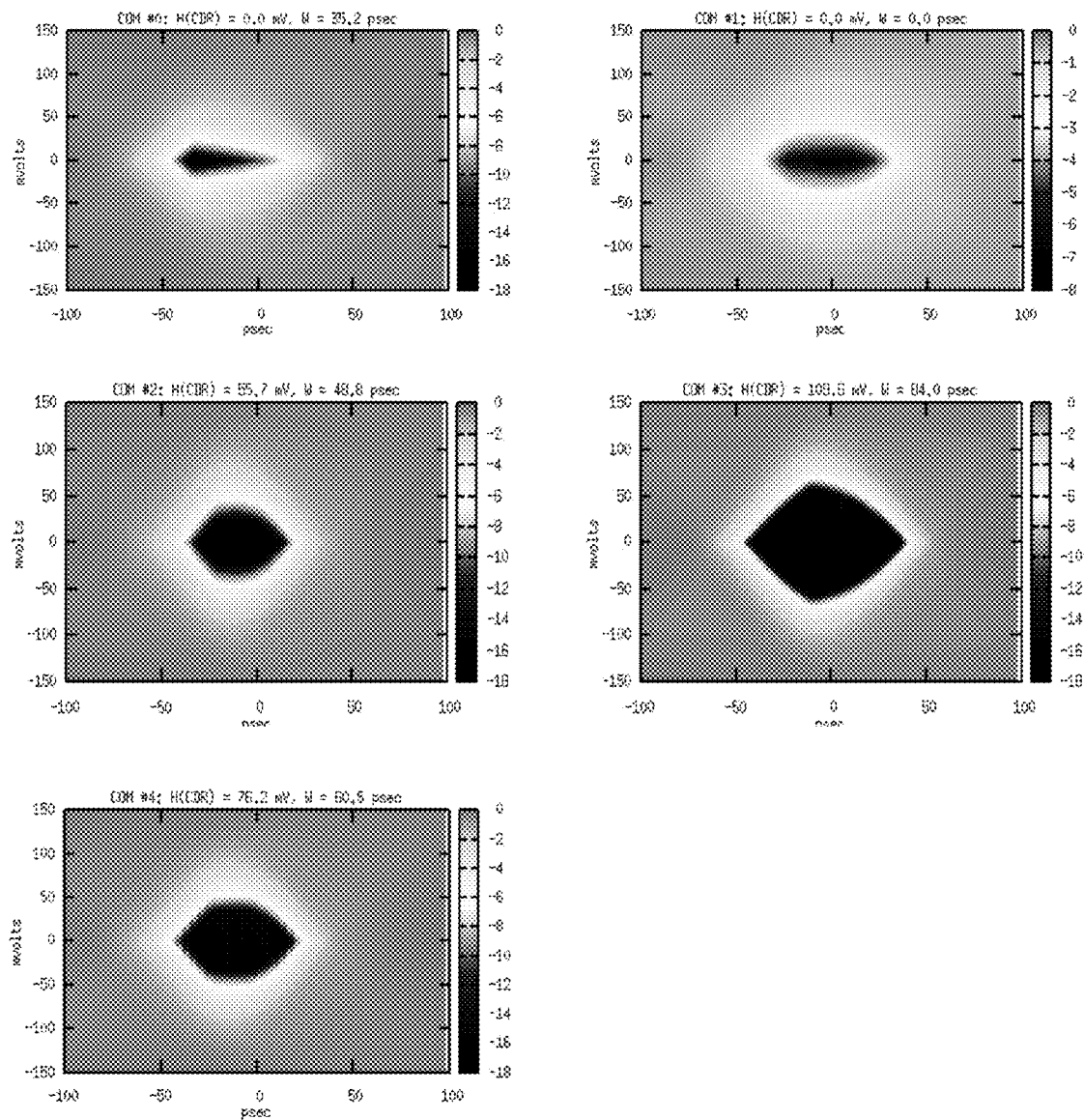
FIG. 10 illustrates eye diagrams for a 5-wire embodiment without eliminating inductively bad patterns.
Figure 11:
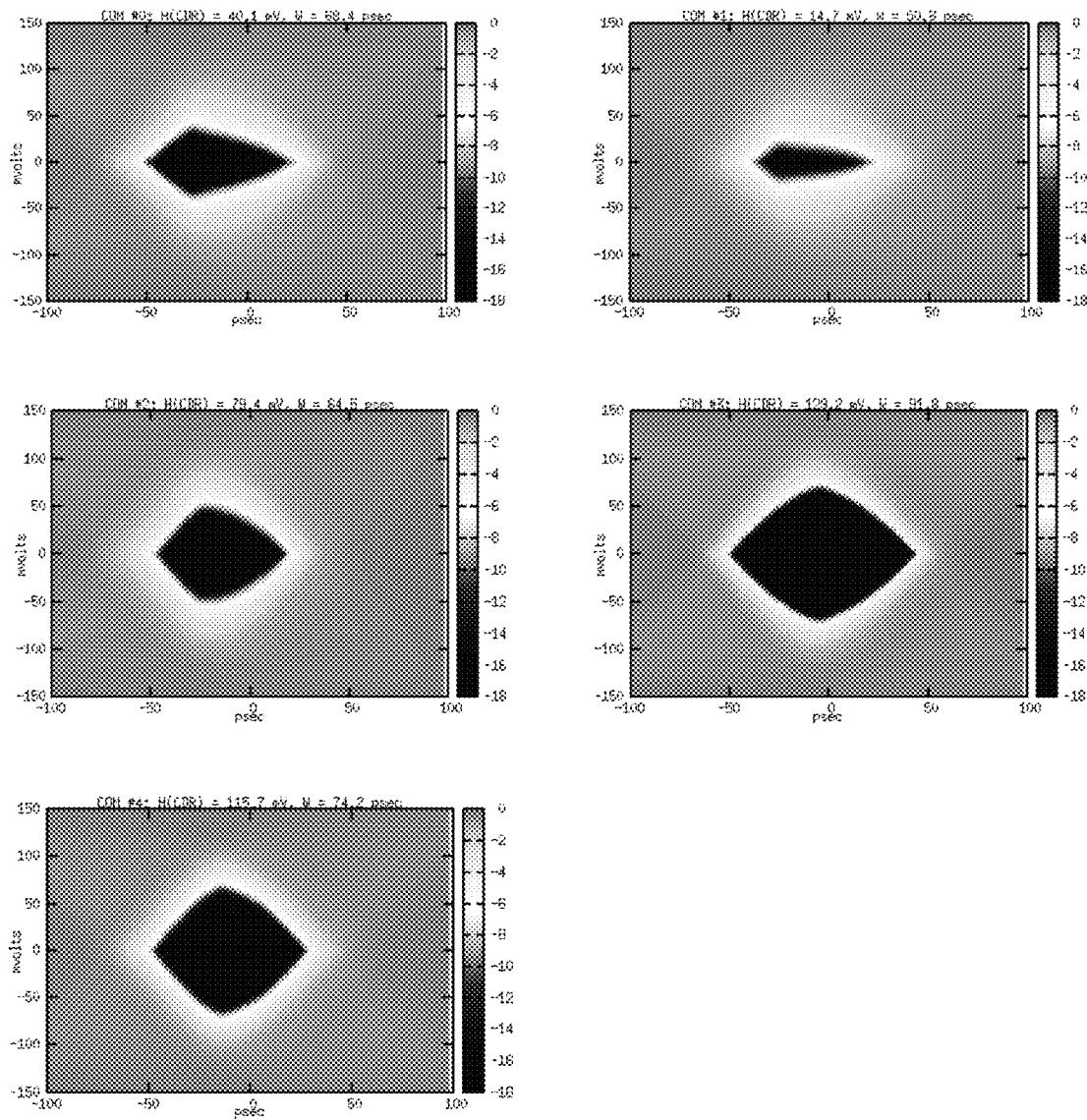
FIG. 11 illustrates eye diagrams for a 5-wire embodiment eliminating inductively bad patterns.
Figure 12:
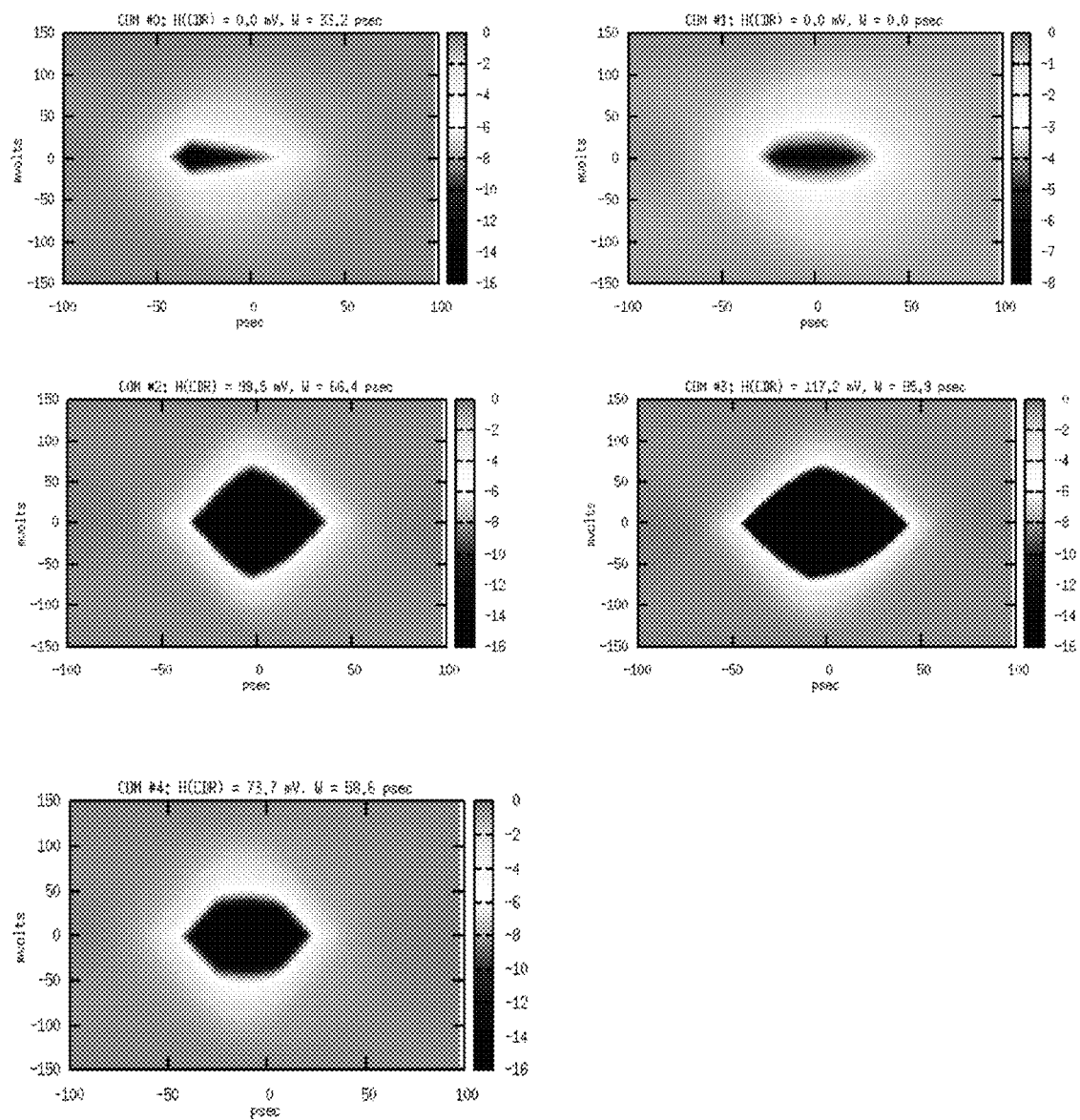
FIG. 12 illustrates eye diagrams for a 5-wire embodiment where only inductively bad patterns are used.

A simulation was performed using an example channel consisting of 5 wires, using communications channel characteristics similar those of the 8-wire case described above. FIG. 10 shows statistical simulations of the eye diagrams of the 5 wires when using single-ended signaling without eliminating the inductively bad patterns. As can be seen, the first two eyes are quite closed. Eliminating the inductively bad patterns yields the eye diagrams of FIG. 11, which are more open. Simulations were also performed using only inductively bad patterns, which are shown in FIG. 12.

Table 2 summarizes the results for both single-ended signaling without eliminating the inductively bad patterns, signaling using only inductively bad patterns, and signaling using KXR to eliminate the inductively bad patterns.

TABLE 2

| Eye width (psec) | | | Eye height (mV) | | |
|---|---|---|---|---|---|
| SE | Inductively bad patterns | KXR | SE | Inductively bad patterns | KXR |
| 35.2 | 33.2 | 68.4 | 0.0 | 0.0 | 40.1 |
| 0.0 | 0.0 | 50.8 | 0.0 | 0.0 | 14.7 |
| 48.8 | 66.4 | 64.5 | 55.7 | 99.5 | 79.4 |
| 84.0 | 85.9 | 91.8 | 109.6 | 117.2 | 129.2 |
| 60.5 | 58.6 | 74.2 | 76.2 | 73.7 | 115.7 |

As can be seen, the effect of KXR is quite dramatic. The middle columns of Table 2 show that the main reason for the bad behavior of single-ended signaling are the inductively bad patterns.

In the general case of w wires, it can be seen that the number of codewords not containing inductively bad patterns is $2 \times F_w$ where $F_w$ is the w-th Fibonacci number: $F_1=1$, $F_2=2$, $F_3=F_2+F_1=3$, $F_4=F_3+F_2=5$, $F_5=F_4+F_3=8$, etc.

Very similar relationships hold for codes not containing capacitively bad patterns.

In the case of 5 wires, 4 bits can be sent. In general, since the state space is being limited, it is not possible to send at full rate. The present methods and systems are useful in, among other scenarios, cases where there are additional wires present and dedicated to other tasks. One such example, discussed below, is the "mask bit" used for memory interfaces.

Coding with States

Coding schemes that memorize states from one transition to another are utilized in order to further increase the rate of the transmission. The second disclosed set of embodiments of KXR units incorporate some state information that gets updated from one transition to another. In these embodiments, the operation of the KXR unit is slightly more complex. Moreover, further control is used to reset the state information during periods of inactivity of the link. This is described below in the context of memory links, without the need of a direct communication between KXR and the analog receiver/transmitter.

Stateful Example 1: 3 Wires

In this description of this embodiment, it is assumed that the state of the wires at the previous time instance is (x,y,z)

and that the incoming bits are (a,b,c) corresponding to an integer A between 0 and 6, with a being the most significant bit (so a&b&c=0). In this case, the encoding uses one bit of memory, called m, which is the logical 'AND' of the values on the first and the third wire:

SF-ENC3: Stateful encoding on 3 wires:
Output (a⊕m, b⊕m, c⊕m)
Update m to a⊕m

To see that this encoding indeed does not cause worst case inductive crosstalk on the middle wire, note that m=x. Such crosstalk is caused only if a⊕x=¬x, c⊕x=¬z=¬x, and b⊕x=¬x. This means that a=b=c=1. But by assumption we cannot have a=b=c=1 since a&b&c=0.

The decoder's operation is similar to that of the encoder. The decoder receives bits x, y, z on the three wires, and additionally has a bit m which is the logical and of the bits on the first and the third wire at the previous round:

SF-DEC3: Stateful decoding on 3 wires
Output (x⊕m, y⊕m, z⊕m)
Update m to x⊕m.

The case of capacitive crosstalk can also be handled in a similar manner.

Stateful Example 2: 4 Wires

In this embodiment, the state that is remembered is two bits only, called x and v. These two bits are equal to the bits on wires 1 and 4, respectively, sent in the previous round.

At any given time, given 4 bits (a,b,c,d) representing an integer A between 0 and 11, and a being the most significant bit (hence a&b=0), and given the prior states $m_1$, $m_2$, a new set of 4 bits is computed, and the states $m_1$, $m_2$ are updated. The encoding algorithm is as follows:

SF-ENC4: Stateful encoding on 4 wires
IF (A=10) THEN
    Output (x,x,x,¬x).
    $m_2$:=¬x. EXIT.
IF (A=11) THEN
    Output (¬v,v,v,v).
    $m_1$:=¬v. EXIT.
IF (A<4) THEN
    Output (c, c, ¬c, d).
    $m_1$:=c, $m_2$:=d.
ELSE
    Output (d, ¬d, ¬b⊕(d&c), d⊕c).
    $m_1$:=d, $m_2$:=d⊕c.

The decoder essentially performs these operations in reverse, though it does not need additional states. Given incoming bits ($s_0$, $s_1$, $s_2$, $s_3$), the decoder performs the following steps:

SF-DEC4: Stateful decoding on 4 wires
IF ($s_0$=$s_1$ and $s_1$=$s_2$) THEN
    Output (1,0,1,0). EXIT.
IF ($s_1$=$s_2$ and $s_2$=$s_3$) THEN
    OUTPUT (1,0,1,1). EXIT.
IF ($s_0$=$s_1$) THEN
    Output (0,0, $s_0$, $s_3$). EXIT.
ELSE
    Output ((z⊕(x&(¬u)), ¬(z⊕(x&(¬u)), x⊕u, x)

The case of capacitive crosstalk can also be handled in a similar manner.

Stateful Example 3: 5 Wires

In this description of this embodiment, it is assumed that the state of the wires at the previous time instance is (x,y,z,u,v) and that the incoming bits are (a,b,c,d,e). This sequence is interpreted as the binary expansion of an integer, called A, between 0 and 21 (with a representing the most significant bit of that integer). Four bits of memory are used: $m_0$, $m_1$, $m_2$, $m_3$, $m_4$. In operation, $m_0$ corresponds to state x of the first wire in the previous transmission, $m_1$ corresponds to state z of the third wire in the previous transmission, $m_2$ corresponds to the state v of the fifth wire in the previous transmission, and $m_3$ is y, and $m_4$=1 if and only if in the previous transmission it is the case that y=u=x.

A sequence S of 19 vectors is maintained, the vectors being potential successor states for the wire states, no matter what the previous states are. This sequence is given below:

S[0]=[0,0,1,0], S[1]=[1, 0, 1, 0, 0], S[2]=[0, 1, 1, 0, 0],
   S[3]=[1, 0, 0, 1, 0],
S[4]=[1, 1, 0, 1, 0], S[5]=[0, 0, 1, 1, 0], S[6]=[1, 0, 1, 1, 0],
S[7]=[0, 1, 0, 0, 1], S[8]=[1, 1, 0, 0, 1], S[9]=[0, 0, 1, 0, 1],
S[10]=[0, 1, 1, 0, 1], S[11]=[1, 0, 0, 1, 1], S[12]=[0, 1, 0, 1, 1],
S[13]=[1, 1, 0, 1, 1], S[14]=[$m_0$, $m_0$, $m_0$, ¬$m_0$, ¬$m_0$],
S[15]=[$m_0$, $m_0$, $m_0$, ¬$m_0$, $m_0$], S[16]=[¬$m_2$, ¬$m_2$, $m_2$, $m_2$, $m_2$],
S[17]=[$m_2$, ¬$m_2$, $m_2$, $m_2$, $m_2$], S[18]=[¬$m_3$, $m_3$, $m_3$, $m_3$, ¬$m_3$].

The exact ordering of this set is only relevant to the efficiency of any procedure that maps integers between 0 and 18 to the specific elements of this sequence. This sequence has the properties that (a) it does not contain a sequence of the form (u,¬u, u,¬u, u), where u is 0 or 1 (it can be seen that such sequence would not allow for 22 successor states that are all inductively good) and (b) all of these successor states are inductively good for the previous state (x,y,z,u,v) of the wires. The extension of this set by three more elements is shown below. These elements depend on the relationship between the memory bits.

If $m_0$=$m_1$=$m_2$, then set S[19]=[$m_0$, $m_0$, $m_0$, $m_0$, ¬$m_0$], S[20]=[¬$m_0$, $m_0$, $m_0$, $m_0$, $m_0$], S[21]=[$m_0$, $m_0$, $m_0$, $m_0$, $m_0$].

If $m_0$=$m_1$≠$m_2$, and $m_4$=1, then set S[19]=[$m_2$, $m_2$, ¬$m_2$, ¬$m_2$, ¬$m_2$], S[20]=[¬$m_2$, $m_2$, ¬$m_2$, ¬$m_2$, ¬$m_2$], S[21]=[$m_0$, $m_0$, $m_0$, $m_0$, $m_0$].

If $m_0$=$m_1$≠$m_2$, and $m_4$=0, then set S[19]=[$m_2$, $m_2$, ¬$m_2$, ¬$m_2$, ¬$m_2$], S[20]=[¬$m_2$, $m_2$, ¬$m_2$, ¬$m_2$, ¬$m_2$], S[21]=[$m_0$, ¬$m_0$, ¬$m_0$, ¬$m_0$, ¬$m_0$].

If $m_0$≠$m_1$, and $m_4$=1, then set S[19]=[¬$m_0$, ¬$m_0$, ¬$m_0$, $m_0$, $m_0$], S[20]=[¬$m_0$, ¬$m_0$, ¬$m_0$, $m_0$, ¬$m_0$], S[21]= [$m_0$, $m_0$, $m_0$, $m_0$, ¬$m_0$].

If $m_0$≠$m_1$, and $m_4$=0, then set S[19]=[¬$m_0$, ¬$m_0$, ¬$m_0$, $m_0$, $m_0$], S[20]=[¬$m_0$, ¬$m_0$, ¬$m_0$, $m_0$, ¬$m_0$], S[21]=[¬$m_0$, ¬$m_0$, ¬$m_0$, ¬$m_0$, $m_0$].

With these preparations, the encoding procedure can be stated as follows:

SF-ENC5: Stateful encoding on 5 wires

Given integer A, and previous states $m_0$-$m_4$, select the vector S[A] as the next state. Set $m_0$ to S[A][1], $m_1$ to S[A][3], $m_3$ to S[A][5], $m_4$ to S[A][2], and $m_4$ to 1 if and only if $m_4$=S[A][4]=$m_0$.

The decoding procedure is the following. In this form it requires only one previous state:

SF-DEC5: Stateful decoding on 5 wires

Given a bit sequence (x,y,z,u,v) and one previous state m, do the following:

a. Determine the longest run r of equal values in the vector.

b. If r<3, then determine an index A from 0 to 13 such that S[A] is the given bit sequence. Output A and go to Step e.

c. If r=3, then
 i. If m=1, then determine index A between 14 and 18 such that S[A] is the given bit sequence. Output A and go to Step e.
 ii. If not, then determine index A between 14 and 20 such that S[A] is the given bit sequence. Output A and go to Step e.
d. If r=4 or r=5, then
 i. If m=1, then determine index A between 19 and 21 such that S[A] is the given bit sequence. Output A and go to Step e.
 ii. If not, output A=21.
e. Update m: if x=z=v, then set m=1, else set m=0. EXIT.

A Procedure to Determine Whether a (N,w)-KXR Exists

One of the questions that arise in the design of crosstalk-reducing codes is: what is the largest number N of states that can be encoded when w wires are available? In other words, what is the largest number N for which an (N, w)-KXR exists? The examples above show that N≤7 if w=3, N≤12 if w=4, and N≤22 if w=5. A priori, it is not clear that these bounds are sharp, i.e., that it is not possible to achieve larger values of N for the given number of wires.

A procedure that finds the maximum value of N for a given value w is outlined below. This procedure is described using the language of directed graphs; as known to those of skill in the art, a directed graph is a structure consisting of a finite set of "nodes" and a finite set of pairs (x,y) where x and y are nodes. Such a pair is often interpreted as an "arrow" between x and y. The "outdegree" of a node is the number of arrows leading out of the node, and the "indegree" of a node is the number of arrows leading into the node.

Given the number w of wires, the graph G that is of interest in this context has as its set of nodes the $2^w$ vectors in the set $\{0,1\}^w$, i.e., the set of all binary vectors of length w. These are potentially the values that can be sent on the w wires. In this procedure, an arrow is placed between a vector x and a vector y if y is a valid successor for x, i.e., if a transition from x to y does not lead to worst-case inductive (or capacitive) crosstalk on any of the wires. Once G is constructed, the number N will be the size of the largest subgraph of G for which every node has outdegree N. The nodes that are not in this subgraph are states that the wires will never be in, when using this type of coding.

To find whether this largest subgraph has a size of at least n, for a given n, the following steps are carried out: all of the nodes that have outdegree that is strictly smaller than n are deleted from G; this is done until either the graph has fewer than n elements or until all of the remaining nodes in the graph have outdegree at least n; if the first of those two cases occurs, it is concluded that the required subgraph has fewer than n nodes; if instead the second of those two cases occurs, it is concluded that the required subgraph has at least n nodes (and indeed such a subgraph has thereby been identified).

To find the largest subgraph, a search is conducted for N using a binary search and the above method. Once N is found, a largest subgraph has also been found.

Figure 5:
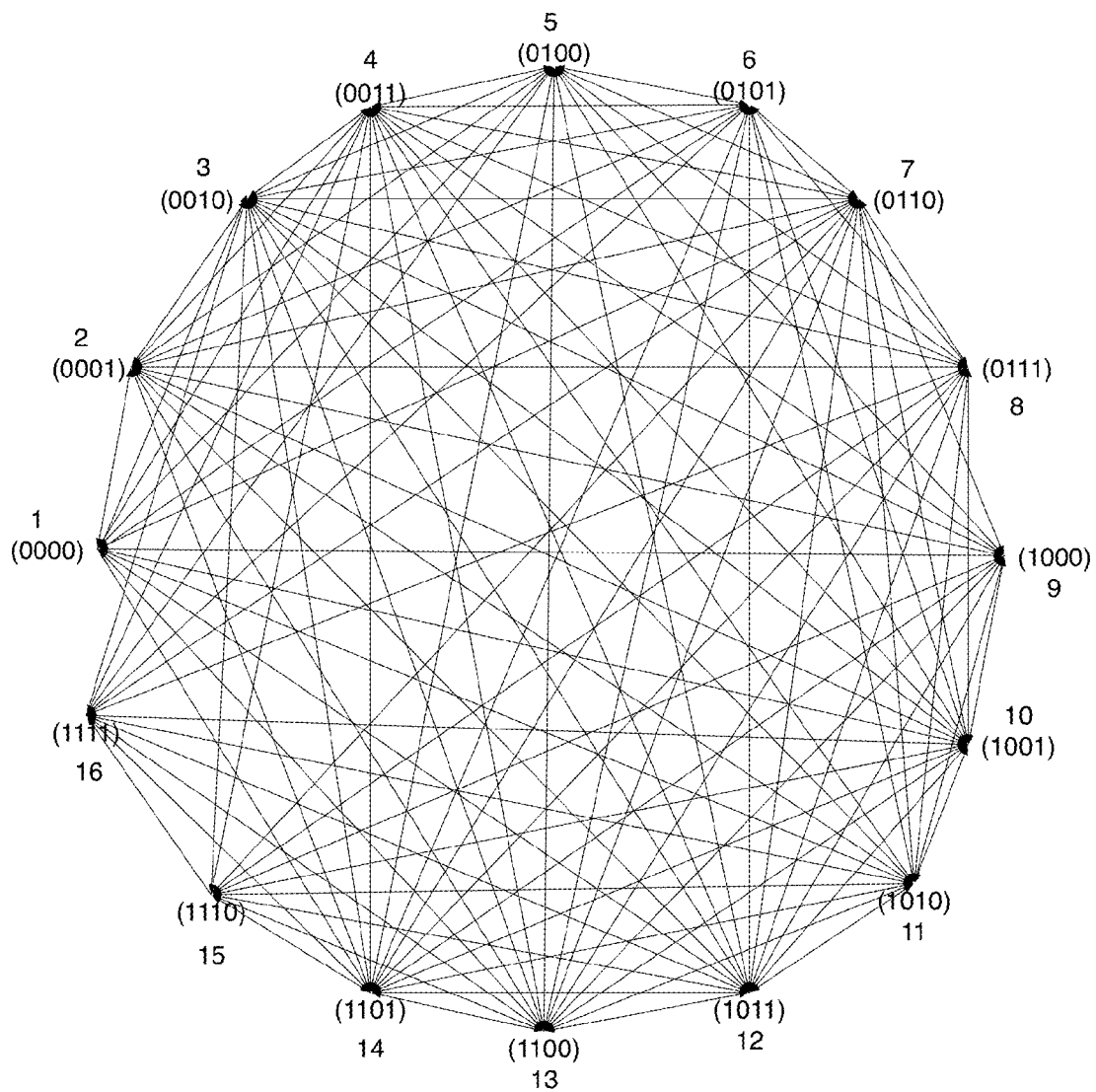
FIG. 5 is a graph for the largest subgraph with w=4.

An example in which w=4 is now briefly considered. The graph G corresponding to this case is shown in FIG. 5, where symbolic names 1, 2, . . . , 16 have been assigned to the nodes of the graph, and where every node is also labeled with the vector corresponding to that node. As examples, the node 1 corresponds to the vector (0000) and the node 11 corresponds to (1010). Also, to simplify the figure somewhat, the self-loops—i.e., transitions from a vector to itself—have been omitted. This is for clarity of presentation and not by way of limitation.

The list of neighbors of every node and the outdegree of the node are given in Table 3.

TABLE 3

| Node | Neighbors | Out-degree |
|---|---|---|
| 1 | [1, 2, 3, 4, 5, 6, 7, 9, 10, 11, 12, 13, 14] | 13 |
| 2 | [1, 2, 3, 4, 5, 6, 7, 8, 9, 10, 11, 12, 13, 14] | 14 |
| 3 | [1, 2, 3, 4, 5, 6, 7, 9, 10, 11, 12, 13, 14, 15] | 14 |
| 4 | [1, 2, 3, 4, 5, 6, 7, 8, 9, 10, 11, 12, 13, 14, 15, 16] | 16 |
| 5 | [1, 2, 3, 4, 5, 6, 7, 8, 9, 10, 11, 12, 13, 14] | 14 |
| 6 | [2, 3, 4, 5, 6, 7, 8, 10, 11, 12, 13, 14] | 12 |
| 7 | [1, 2, 3, 4, 5, 6, 7, 8, 9, 10, 11, 12, 13, 14, 15, 16] | 16 |
| 8 | [2, 3, 4, 5, 6, 7, 8, 10, 11, 12, 13, 14, 15, 16] | 14 |
| 9 | [1, 2, 3, 4, 5, 6, 7, 9, 10, 11, 12, 13, 14, 15] | 14 |
| 10 | [1, 2, 3, 4, 5, 6, 7, 8, 9, 10, 11, 12, 13, 14, 15, 16] | 16 |
| 11 | [3, 4, 5, 6, 7, 9, 10, 11, 12, 13, 14, 15] | 12 |
| 12 | [3, 4, 5, 6, 7, 8, 9, 10, 11, 12, 13, 14, 15, 16] | 14 |
| 13 | [1, 2, 3, 4, 5, 6, 7, 8, 9, 10, 11, 12, 13, 14, 15, 16] | 16 |
| 14 | [2, 3, 4, 5, 6, 7, 8, 10, 11, 12, 13, 14, 15, 16] | 14 |
| 15 | [3, 4, 5, 6, 7, 8, 9, 10, 11, 12, 13, 14, 15, 16] | 14 |
| 16 | [3, 4, 5, 6, 7, 8, 10, 11, 12, 13, 14, 15, 16] | 13 |

Figure 6:
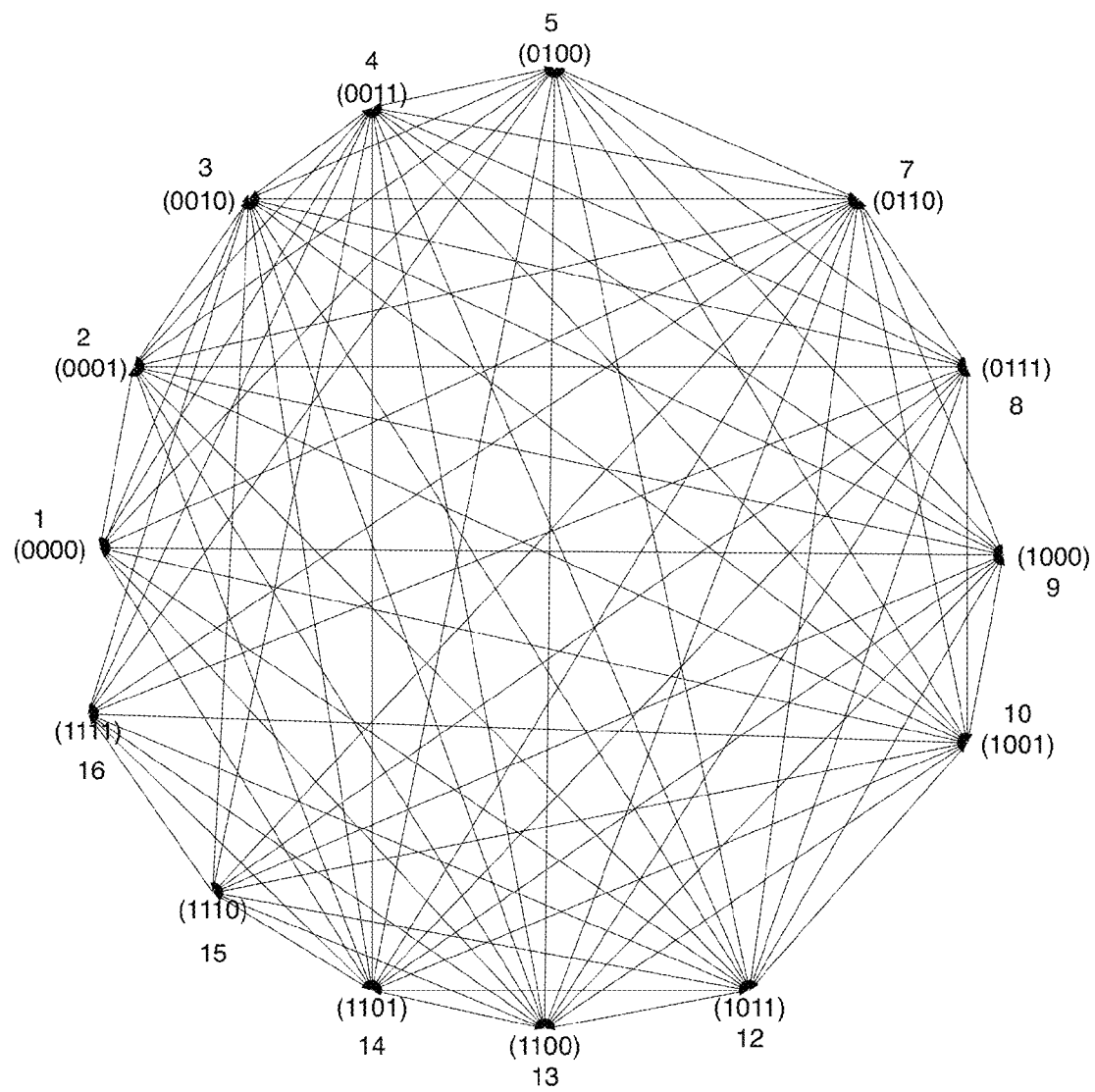
FIG. 6 is a graph for the proof that there is no (12,4)-KXR code.

It is now demonstrated that there is no (13,4)-KXR code. To demonstrate this, it is initially assumed that there is an (N,4)-KXR code where N>12. Making this assumption results in removal of nodes 6 and 11 from the graph, since they each have a degree less than 13. The resulting graph is shown in FIG. 6, and the list of neighbors in this new graph as well as the new outdegrees is given in Table 4.

TABLE 4

| Node | Neighbors | Out-degree |
|---|---|---|
| 1 | [1, 2, 3, 4, 5, 7, 9, 10, 12, 13, 14] | 11 |
| 2 | [1, 2, 3, 4, 5, 7, 8, 9, 10, 12, 13, 14] | 12 |
| 3 | [1, 2, 3, 5, 4, 7, 9, 10, 12, 13, 14, 15] | 12 |
| 4 | [1,2, 3,4, 5, 7, 8, 9, 10, 12, 13, 14, 15, 16] | 14 |
| 5 | [1, 2, 3, 4, 5, 7, 8, 9, 10, 12, 13, 14] | 12 |
| 6 | [2, 3, 4, 5, 7, 8, 10, 12, 13, 14] | 10 |
| 7 | [1,2, 3,4, 5, 7, 8, 9, 10, 12, 13, 14, 15, 16] | 14 |
| 8 | [2, 3, 4, 5, 7, 8, 10, 12, 13, 14, 15, 16] | 12 |
| 9 | [1, 2, 3, 4, 5, 7, 9, 10, 12, 13, 14, 15] | 12 |
| 10 | [1, 2, 3,4, 5, 7, 8, 9, 10, 12, 13, 14, 15, 16] | 14 |
| 11 | [3, 4, 5, 7, 9, 10, 12, 13, 14, 15] | 10 |
| 12 | [3, 4, 5, 7, 8, 9, 10, 12, 13, 14, 15, 16] | 12 |
| 13 | [1, 2, 3, 4, 5, 7, 8, 9, 10, 12, 13, 14, 15, 16] | 14 |
| 14 | [2, 3, 4, 5, 7, 8, 10, 12, 13, 14, 15, 16] | 12 |
| 15 | [3, 4, 5, 7, 8, 9, 10, 12, 13, 14, 15, 16] | 12 |
| 16 | [3, 4, 5, 7, 8, 10, 12, 13, 14, 15, 16] | 11 |

It can be seen at this point in this demonstration that the number of nodes of outdegree at least 13 is less than 13, which means that a (13,4)-KXR cannot exist.

Table 5 lists, for values of w between 3 and 9, the largest N such that an (N, w)-KXR exists.

TABLE 5

| w | 3 | 4 | 5 | 6 | 7 | 8 | 9 |
|---|---|---|---|---|---|---|---|
| N | 7 | 12 | 22 | 40 | 72 | 136 | 248 |

Memory Interfaces

KXR coding typically requires more data wires than the number of transmitted data bits, since it restricts the state space of the wire values in every transmission. Normally, this would mean that the data would have to be sent using a faster clock rate in order to achieve the same throughput as without KXR coding. Whether this can be done is application-dependent. There are, however, some applications in which the total number of wires carrying main and additional data is already larger than the actual number of bits transmitted. KXR coding may be particularly interesting for such applications, one of which relates to memory interfaces and is described below.

In a typical memory interface, as found in various flavors of DDR, data transmission is organized in groups of 9 wires and data is transmitted in a single-ended manner on the 9 wires. These wires transmit altogether one byte of data in every transmission, plus one "mask bit." Typically, if the mask bit is detected on the 9th wire, the controller (or the memory) disregards the data transmitted on the data wires.

A different way of transmitting the data as an ensemble—that is known to those of skill in the art—is to identify at least 257 states on the 9 wires, map 256 of those to 8 bits of data, and the 257th state to the mask. Whenever the 257th state is encountered, the data represented by the 9 wires in that ensemble transmission is disregarded.

As can be seen from the results of the last section, it is not possible to construct a (257,9)-KXR, a code that would be needed to reduce nearest neighbor crosstalk in memory systems. Discussed below are two options for addressing this.

In the first variant, a (248,9)-KXR is used and the clock rate is increased by about 5% to effectively send 1 out of 257 possibilities per transmission. More precisely, 19 such combinations of data+mask can be mapped to 20 channel uses of a code with 248 states. These 19 combinations are collected and mapped to the 20 codewords of the (248,9)-KXR. These codewords are sent over the 9 wires in 20 intervals and decoded. The decoded codewords enter a buffer on the receiving side, and as soon as 20 of them are collected, they are decoded to the 19 combinations of data+mask.

Another option is to use a stateless (130,9)-KXR, which is capable of sending slightly more than 7 bits over the 9-wire channel. A sequence of length 7 consisting of data+mask bits (each coming from 257 states) can be mapped to 8 codewords of this (130,9)-KXR. These can be sent across the channel and decoded by the receiver to recover the original sequence of 7 words.

This option has the advantage that it results in lower worst-case nearest-neighbor crosstalk for all the wires in the interface, provided that the 9-wire interface is sufficiently separated from other 9-wire interfaces so as to minimize crosstalk from wires in the adjacent interfaces. It has possible disadvantages as well: it may create a higher latency, and the clock needs to run slightly faster (by a factor of 20/19~1.053 in the first case and by a factor of 8/7~1.143 in the second case), which means that the addition of KXR may not be completely transparent to the rest of the communication system.

Another option results in halving worst-case nearest-neighbor inductive or capacitive crosstalk on all but two of the wires in the interface. This code uses a combination of a (22,5)-KXR and a (12,4)-KXR. The encoder operates as follows:

It receives an integer A between 0 and 256.
It calculates integers $A_1$ and $A_2$ such that $A=22*A_1+A_2$, and $0 \leq A_2 < 22$ (so that $0 \leq A_1 < 12$).
It uses SF-ENC5 on $A_2$ to create the wire values $x_0, \ldots, x_4$ on the first five wires, and it uses SF-ENC4 on $A_1$ to create the wire values $x_5, \ldots, x_8$ on the last four wires.

The decoder operates as follows:
It receives the wire values $x_0, \ldots, x_8$.
It uses SF-DEC5 on the values $x_0, \ldots, x_4$ to obtain a value $A_1$ between 0 and 21, and it uses SF-DEC4 on the values $x_5, \ldots, x_8$ to obtain a value $A_2$ between 0 and 11.
It calculates $A=22*A_1+A_2$.
If $A>255$, then it deduces that the mask bit is active and sends the value of an active mask bit to the controller or memory.
If not, then it sends the 8 bits representing A to the controller or memory.

While the effect of the worst case nearest neighbor crosstalk is halved on wires 2, 3, 4, 7, 8, wires 5 and 6 may still experience such crosstalk. This is because the encoders SF-ENC5 and SF-ENC4 are not correlated, and depending on the switching activities of the last two wires within the group of the first five wires and the switching activities of the first two wires within the group of the last four wires, one could have worst-case crosstalk on these two wires.

In some embodiments, a method of reducing crosstalk in a multi-wire communications system is described in which data is transmitted on multiple wires according to transmission unit intervals. The method comprises: identifying wire sequences that (i) span consecutive transmission unit intervals and (ii) induce at least one of capacitive crosstalk and inductive crosstalk between the multiple wires; encoding communications data as consecutive ensembles to be transmitted on the multiple wires such that none of the identified wire sequences will occur on any of the multiple wires; and transmitting the encoded communications data on the multiple wires of the multi-wire communications system.

Further embodiments include a system for reducing crosstalk in multi-wire communications systems, the system comprising: an encoding of input data as ensembles of symbols; a communications interconnection comprised of multiple elements each configured to communicate one or more symbols of the encoded data; a transmit driver emitting symbols of encoded data onto the multiple elements of the communications interconnection in a transmit interval; a crosstalk analysis comprised of a ranking by crosstalk amount of transmitted symbol sequences on two or more adjacent elements of the communications interconnection occurring in consecutive transmit intervals; wherein the encoding is constrained to avoid symbol sequences ranking above a predetermined limit by the crosstalk analysis.

The embodiments presented herein illustrate the use of ensemble codes for point-to-point wire communications. However, this should not be interpreted as limiting the scope of the present methods and systems, which are equally applicable to other interconnection topologies, expressly including bussed and multi-drop interconnections using unidirectional and bidirectional communications protocols, as well as other known encoding methods and communications media including but not limited to optical and wireless. Thus, descriptive terms such as "voltage" or "signal level" should be considered to include both electrical equivalents such as "current", and also equivalents in other measurement systems, such as "optical intensity," "RF modulation," etc. Similarly, specific examples provided herein are for purposes of description, and do not imply a limitation.

I claim:

1. A method comprising:
   receiving a set of input data bits and responsively generating a plurality of sets of modulus-converted data bits;
   selecting, for each set of modulus-converted data bits, a corresponding cross-talk reduction codeword vector from a set of crosstalk reduction codeword vectors, wherein each of the crosstalk reduction codeword vectors eliminates patterns of adjacent vector elements associated with either an inductive or capacitive constructive interference; and
   transmitting each selected crosstalk reduction codeword vector on a multi-wire bus.

2. The method of claim 1 wherein, in a set of three wires including a first wire, second wire, and third wire, inductive constructive interference comprises transitions where signal levels on the first wire and third wire transition to the same signal level of the second wire, and capacitive constructive interference comprises signal levels on the first wire and third wire transition to an opposite signal level of the second wire.

3. The method of claim 1, further comprising generating a plurality of sets of output modulus-converted data bits based on a decoding of the of cross-talk reduction codeword vectors.

4. The method of claim 1, wherein the encoding is performed in a stateless manner, each crosstalk reduction codeword vector selected based only on the set of modulus-converted data bits to be encoded.

5. The method of claim 1, wherein the encoding is performed in a stateful manner, each crosstalk reduction codeword vector selected based on both the set of modulus converted data bits to be encoded and at least one previous operation of the encoder.

6. The method of claim 1, wherein two sets of 3 modulus-converted data bits are generated from a set of 5 input data bits.

7. The method of claim 6, wherein the modulus-converted data bits are modulus 6.

8. The method of claim 7, wherein the cross-talk reduction codeword vectors are selected from the group consisting of: (1,1,0), (1,0,1), (1,0,0), (0,0,1), (0,1,0), (0,1,1).

9. The method of claim 1, wherein sets of 4 modulus-converted data bits are used to generate crosstalk reduction vectors having 4 elements.

10. The method of claim 9, wherein the cross-talk reduction codeword vectors are selected from the group consisting of: (1,1,0,1), (1,0,1,1), (1,0,0,1), (1,1,0,0), (1,0,1,0), (0,0,1,0), (0,1,0,0), (0,1,1,0), (0,0,1,1), (0,1,0,1).

11. A system comprising:
    a plurality of signal conductors configured to receive a set of input data bits;
    a bit generator connected to the signal conductors configured to receive the input data bits and to responsively generate a plurality of sets of modulus converted data bits;
    a logic encoding circuit connected to the bit generator configured to form, for each set of modulus converted data bits, a corresponding crosstalk reduction codeword vector, wherein each crosstalk reduction codeword vector eliminates patterns of adjacent vector elements associated with either an inductive or capacitive constructive interference; and
    a transmit driver configured to emit the crosstalk reduction codewords onto a multi-wire transmission bus.

12. The system of claim 11 further comprising a logic decoding receiver configured to decode the crosstalk reduction codeword vectors received from the multi-wire transmission bus to recover the plurality of sets of modulus converted data bits.

13. The system of claim 11, wherein the multi-wire transmission bus contains at least 3 wires.

14. The system of claim 11, wherein the crosstalk reduction codeword vectors are based on the modulus converted data bits and at least one of a previous encoding and previous modulus converted data bit.

15. The system of claim 11, wherein the bit generator is configured to generate two sets of 3 modulus-converted data bits from a set of 5 input data bits.

16. The system of claim 15, wherein the cross-talk reduction codeword vectors are selected from the group consisting of: (1,1,0), (1,0,1), (1,0,0), (0,0,1), (0,1,0), (0,1,1).

17. The system of claim 11, wherein the bit logic encoder is configured to generate crosstalk reduction vectors having 4 elements based on sets of 4 modulus-converted data bits.

18. The system of claim 17, wherein the cross-talk reduction codeword vectors are selected from the group consisting of: (1,1,0,1), (1,0,1,1), (1,0,0,1), (1,1,0,0), (1,0,1,0), (0,0,1,0), (0,1,0,0), (0,1,1,0), (0,0,1,1), (0,1,0,1).

19. The system of claim 11, wherein the logic encoding circuit is a stateless encoder.

20. The system of claim 11, wherein the logic encoding circuit is a stateful encoder.

* * * * *